(12) United States Patent
Moss et al.

(10) Patent No.: US 6,974,148 B2
(45) Date of Patent: Dec. 13, 2005

(54) LOW-PROFILE, HITCH-CONCEALING MOUNT

(75) Inventors: Newell Ryan Moss, Mapleton, UT (US); Jack W. Bowers, Springville, UT (US); H. Arthur Wing, Provo, UT (US)

(73) Assignee: B & W Custom Truck Beds, Inc., Humboldt, KS (US)

( * ) Notice: Subject to any disclaimer, the term of this patent is extended or adjusted under 35 U.S.C. 154(b) by 1 day.

(21) Appl. No.: 10/163,086

(22) Filed: Jun. 5, 2002

(65) Prior Publication Data

US 2003/0052472 A1 Mar. 20, 2003

Related U.S. Application Data

(63) Continuation-in-part of application No. 09/559,603, filed on Apr. 27, 2000, now Pat. No. 6,460,870, and a continuation-in-part of application No. 09/699,279, filed on Oct. 26, 2000, now Pat. No. 6,712,381, and a continuation-in-part of application No. 10/078,322, filed on Feb. 12, 2002.

(60) Provisional application No. 60/324,872, filed on Sep. 25, 2001, and provisional application No. 60/296,172, filed on Jun. 5, 2001.

(51) Int. Cl.[7] .................................................. B60D 1/06
(52) U.S. Cl. .................. 280/511; 280/416.1; 280/478.1
(58) Field of Search .......................... 280/415.1, 456.1, 280/491.1–491.3, 511, 478.1, 492, 490.1

(56) References Cited

U.S. PATENT DOCUMENTS

| | | | |
|---|---|---|---|
| 2,221,278 A | 11/1940 | Utterback |
| 2,547,299 A | 4/1951 | Williams |
| 2,576,383 A | 11/1951 | Avery |
| 2,604,331 A | 7/1952 | Kingston |
| 2,823,930 A | 2/1958 | Cooper |
| 2,849,243 A | 8/1958 | Halverson |
| 2,872,213 A | 2/1959 | Hosford |
| 2,889,155 A | 6/1959 | Sandage |
| 3,117,805 A | 1/1964 | Schoeffler |
| 3,400,949 A | 9/1968 | Kendall |

(Continued)

FOREIGN PATENT DOCUMENTS

| | | |
|---|---|---|
| BE | 715 681 A | 10/1968 |
| DE | 3639183 | 8/1987 |
| FR | 2227739 | 11/1974 |
| FR | 2450167 | 10/1980 |

OTHER PUBLICATIONS

JC Whitney Catalog, Business Edition Catalog No. 630B, pp. 79–81.
Boating Life, p. 89, Sep./Oct. 1999.
Trailer Boats, p. 90, Sep. 1999.
Herrington, The Enthusiasts Catalog, p. 1, Memorial Day '00.
Northern Tool & Equipment Co., pp. 278–281, Summer 2000.

*Primary Examiner*—Lesley D. Morris
*Assistant Examiner*—Matthew Luby
(74) *Attorney, Agent, or Firm*—TraskBritt

(57) ABSTRACT

An apparatus for securing a towing vehicle to a towed vehicle is disclosed. The apparatus includes a base, a mount movably secured to the base and one or more hitches attached to the mount. The mount may rotate, pivot, translate, or otherwise move in relation to the base in order to move the hitch between various positions including one or more towing positions and at least one stored or stowed position. The hitch, or hitches, may also be movably secured to the mount for additional flexibility in configuring the apparatus in the towing and stowed positions. Additionally, when multiple hitches are provided, each of the multiple hitches may be configured as different size or style of hitch such that a user may select one of the hitches depending on the intended use thereof.

32 Claims, 35 Drawing Sheets

U.S. PATENT DOCUMENTS

| | | |
|---|---|---|
| 3,630,546 A | 12/1971 | Church |
| 3,655,221 A | 4/1972 | Warner |
| 3,664,686 A | 5/1972 | Anderson |
| 3,717,362 A | 2/1973 | Johnson |
| 3,734,540 A | 5/1973 | Thiermann |
| 3,751,072 A | 8/1973 | Williams |
| 3,779,653 A | 12/1973 | Charlton |
| 3,801,134 A | 4/1974 | Dees |
| 3,891,238 A | 6/1975 | Ehlert |
| 3,963,266 A | 6/1976 | Thelin |
| 3,979,138 A | 9/1976 | George et al. |
| 4,022,490 A | 5/1977 | Rocksvold |
| 4,033,601 A | 7/1977 | Lindahl et al. |
| 4,232,877 A | 11/1980 | Milton |
| 4,248,450 A | 2/1981 | McWethy |
| 4,275,899 A | 6/1981 | Humphrey |
| 4,456,279 A | 6/1984 | Dirck |
| 4,482,167 A | 11/1984 | Haugrud |
| 4,492,386 A | 1/1985 | Roberts |
| 4,568,098 A | 2/1986 | Landry, Jr. |
| 4,610,457 A | 9/1986 | Harmon |
| 4,697,818 A | 10/1987 | Moore |
| 4,711,461 A | 12/1987 | Fromberg |
| 4,721,324 A | 1/1988 | Blacklaw |
| 4,758,015 A | 7/1988 | Pixley |
| 4,772,039 A | 9/1988 | Cook |
| 4,792,153 A | 12/1988 | Galdes |
| 4,807,899 A | 2/1989 | Belcher |
| 4,807,900 A | 2/1989 | Tate |
| 4,844,498 A | 7/1989 | Kerins et al. |
| 4,938,496 A | 7/1990 | Thomas et al. |
| 4,944,525 A | 7/1990 | Landry |
| 4,951,957 A | 8/1990 | Gullickson |
| 5,000,473 A | 3/1991 | Johnson |
| 5,033,764 A | 7/1991 | Blacklaw |
| 5,088,754 A | 2/1992 | Skelton |
| 5,106,114 A | 4/1992 | Haupt |
| 5,135,247 A | 8/1992 | Alfaro et al. |
| 5,288,095 A | 2/1994 | Swindall |
| 5,312,128 A | 5/1994 | Blacklaw |
| 5,322,313 A | 6/1994 | Schroeder |
| 5,322,315 A | 6/1994 | Carsten |
| 5,332,250 A | 7/1994 | Thorwall et al. |
| 5,351,982 A | 10/1994 | Walrath |
| 5,375,867 A | 12/1994 | Kass et al. |
| 5,413,366 A | 5/1995 | Gibbons |
| 5,465,991 A | 11/1995 | Kass et al. |
| 5,503,423 A | 4/1996 | Roberts et al. |
| 5,560,630 A | 10/1996 | Phares et al. |
| 5,580,088 A | 12/1996 | Griffith |
| 5,725,229 A | 3/1998 | McWethy |
| 5,727,805 A | 3/1998 | LaRoque |
| 5,741,022 A | 4/1998 | Wass et al. |
| 5,806,872 A | 9/1998 | Szczypski |
| 5,839,744 A | 11/1998 | Marks |
| 5,857,693 A | 1/1999 | Clark, Jr. |
| 5,860,669 A | 1/1999 | Wass et al. |
| 5,871,222 A | 2/1999 | Webb |
| 5,890,727 A | 4/1999 | May |
| D409,124 S | 5/1999 | Bank |
| 5,906,387 A | 5/1999 | Wallace |
| 5,915,714 A | 6/1999 | Bell et al. |
| 5,934,698 A * | 8/1999 | Despain |
| 6,092,827 A | 7/2000 | Korpi et al. |
| 6,116,633 A | 9/2000 | Pride |
| 6,139,043 A | 10/2000 | Gries et al. |
| 6,142,238 A | 11/2000 | Holt et al. |
| 6,149,181 A | 11/2000 | Biederman |
| 6,460,870 B2 | 10/2002 | Moss |
| 6,712,381 B1 | 3/2004 | Moss |
| 6,789,815 B2 | 9/2004 | Moss et al. |
| 2002/0113405 A1 | 8/2002 | Moss et al. |
| 2003/0052472 A1 | 3/2003 | Moss et al. |
| 2003/0218314 A1 | 11/2003 | Moss |

* cited by examiner

LOW-PROFILE, HITCH-CONCEALING MOUNT

CROSS-REFERENCE TO RELATED APPLICATIONS

This patent application claims the benefit of U.S. provisional patent applications Ser. No. 60/296,172 filed Jun. 5, 2001 and entitled FULLY IN-LINE, STOWABLE HITCH and Ser. No. 60/324,872 filed Sep. 25, 2001 and entitled UNIFORM-PROFILE-BALL STOWAWAY HITCH. This application is also a continuation-in-part of U.S. patent application Ser. No. 09/559,603 filed Apr. 27, 2000 and entitled STOWAWAY RECEIVER HITCH, now U.S. Pat. No. 6,460,870, issued Oct. 8, 2002. This application is also a continuation-in-part of U.S. patent application Ser. No. 09/699,279 filed Oct. 26, 2000, now U.S. Pat. No. 6,712,381 and entitled PIVOTING, UNDERSLUNG, STOWAWAY, HITCH MOUNT. This application is also a continuation-in-part of U.S. patent application Ser. No. 10/078,322 filed Feb. 12, 2002 and entitled MONOLITHIC DOUBLE BALL HITCH, now pending.

BACKGROUND

1. Field of the Invention

This invention relates to towing apparatus and, more particularly, to novel systems and methods for securing trailers to towing vehicles with hitches.

2. State of the Art

Trailers have been towed since the earliest days of the wheel. A cart or wagon towed behind an animal is a trailer. In modem times, trailers are secured to towing vehicles by a multiplicity of methods, including frame-mounted hitches and bumper-mounted hitches. Tractor-trailer rigs use fifth-wheel towing systems. Similarly, recreational vehicles sometimes use fifth-wheel towing systems or often a receiver-type mounted ball hitch.

A receiver hitch relies on a receiver cavity or tube securely mounted to the frame of a towing vehicle. The receiver is reinforced and provided with an aperture for receiving a trunnion. A trunnion may be secured into the receiver. On the trunnion may be mounted a hitch. The hitch typically may be a pin hitch or ball hitch but need not be limited thereto.

For recreational users, receiver-type hitches present several common problems. The more important problem may be the difficulty of attaching a greasy hitch to a vehicle and detaching the same after use. Although receiver-type hitches are generally adaptable to receive various trunnions with various types of hitches, the very nature of a receiver bitch may make it problematic. If a trunnion is not removed after use, then a person may accidentally strike a shin or knee on the extending hitch or trunnion when no towed vehicle is attached. If the hitch is removed, it is cumbersome to move, requires some immediate storage place, and may be filthy with grease. Due to the weight of the hitch and trunnion assembly, a person removing the trunnion and hitch from a receiver is likely to soil clothing.

Another problem with many types of hitches is the adjustment of altitude of the hitch itself. Recreational users may have multiple towed vehicles. For example, a boat trailer, a snowmobile trailer, a utility hauling trailer, and the like, may be manufactured at different and arbitrary hitch heights. Similarly, a hitch may be used on different vehicles having different heights. Accordingly, it may be advantageous to provide a hitch mount that may be mounted on any convenient mount, yet be easily adjustable, storable, secure, and so forth.

Thus, it would be an advance in the art to provide a hitch mount that can be stowed without projecting inconveniently far from the bumper, substantially within the envelope or footprint of a vehicle, or even without extending behind the bumper on certain embodiments. Ready access, and substantially weightless or self-supporting deployment of a hitch is extremely desirable as are adjustable height, stowaway positioning, and continual connection.

Along with an adjustment in altitude, it is common to use different sizes of ball hitches. Accordingly, selective stowage and presentation of multiple sizes of ball hitches on a single mount, without having to use a wrench to replace the ball hitch, alone or in combination with height adjustability would be a benefit and convenience.

Many vehicles having recreational and occupational use may also have appeal as luxury vehicles and users of such vehicles may also value the aesthetics of a hitch system when stowed. Accordingly, it would be an advancement in the art to provide a hitch system that hid components of the hitch system out of view when stowed. This is especially true of the hitch itself, which may be covered with grease, may be heavy, and may otherwise require difficult lifting by a user.

BRIEF SUMMARY OF THE INVENTION

An apparatus is disclosed in sufficient detail to enable one of ordinary skill in the art to make and use the invention. In certain embodiments an apparatus in accordance with the invention may have a trunnion for insertion into a receiver tube or cavity of a vehicle. A base may be secured to the trunnion or to the vehicle. The base may also have a mount secured thereto. The mount may have a fastening portion that is sized and positioned to receive a hitch. The mount may pivot with respect to the base between a deployed and a stowed position. In some embodiments, the hitch may pivot toward a stowed position relatively close to a vehicle and a deployed position relatively far from a vehicle. In some embodiments, the hitch may pivot downward and toward a vehicle or pivot sideways and toward a vehicle as it rotates from a deployed position to a stowed position.

In some embodiments, the mount may pivot or rotate with respect to the base about a lateral (e.g., horizontal) or transverse (e.g., vertical) axis that is perpendicular to the direction of travel (e.g., a longitudinal direction) of a vehicle. In some embodiments, a pivot may be used to secure the base to the mount. The mount may have a hitch fastened thereto. The hitch may pivot with respect to the mount. In some embodiments, the hitch may pivot with respect to the mount itself about a lateral or longitudinal axis. In some embodiments, the hitch may be secured to a platform, fastening portion, such as a platform or the like, which is secured to the mount itself.

In some embodiments, the hitch may have one or more apertures formed therein. A pin, bolt, or stud may extend through the aperture and either fixedly or pivotably secure the hitch to the mount. In some embodiments, the hitch itself pivots between deployed and stowed positions. The hitch may pivot downward or sideways with the mount or with respect to the mount about a lateral or transverse axis, e.g., substantially from a deployed position to a stowed position. The hitch itself may be aligned substantially with the direction of travel (e.g., longitudinal direction) of a vehicle when in a stowed position. The hitch may instead rotate with respect to the mount about a longitudinal axis between a deployed towing position and a stowed position.

The mount, in some embodiments, may also translate with respect to the base along a transverse axis providing height adjustability. In some embodiments, the mount may translate along a vertical axis which is orthogonal to both the direction of travel and the lateral (typically horizontal) axis.

Fasteners, such as bolts or pins, may fix the position of the hitch relative to the mount and the position of the mount relative to the base. The mount and hitch may be substantially hidden by a concealing surface of the base when the mount, hitch, or both are in a stowed position.

Various details of bases, mounts, and the like are discussed in U.S. patent application Ser. No. 09/559,603 filed Apr. 27, 2000, entitled STOWAWAY RECEIVER HITCH, U.S. patent application Ser. No. 09/699,279 filed Oct. 26, 2000, entitled PIVOTING, UNDERSLUNG, STOWAWAY, HITCH MOUNT and U.S. patent application Ser. No. 10/078,322 filed Feb. 12, 2002, and entitled MONOLITHIC DOUBLE BALL HITCH, incorporated herein by reference.

BRIEF DESCRIPTION OF THE DRAWINGS

The foregoing and other features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the figures herein, may be arranged and designed in a wide variety of different configurations. Thus, the following more detailed description of the embodiments of the system and method of the present invention, as represented in FIGS. 1 through 34, is not intended to limit the scope of the invention. The scope of the invention is as broad as claimed herein. The illustrations are merely representative of certain embodiments of the invention. Those embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example.

Figure 1:
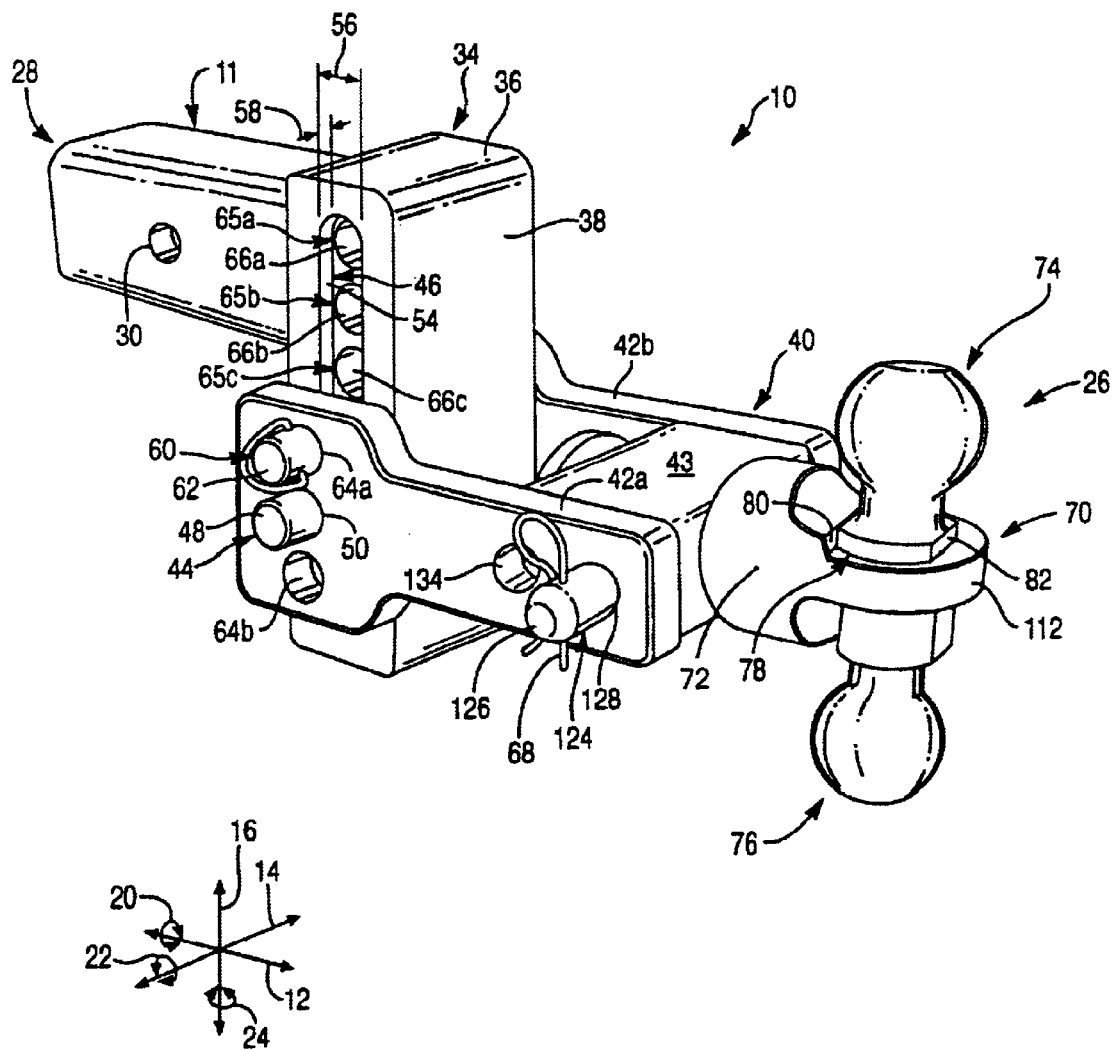
FIG. 1 is a perspective view of one embodiment of a hitch system in accordance with the invention.
Figure 2:
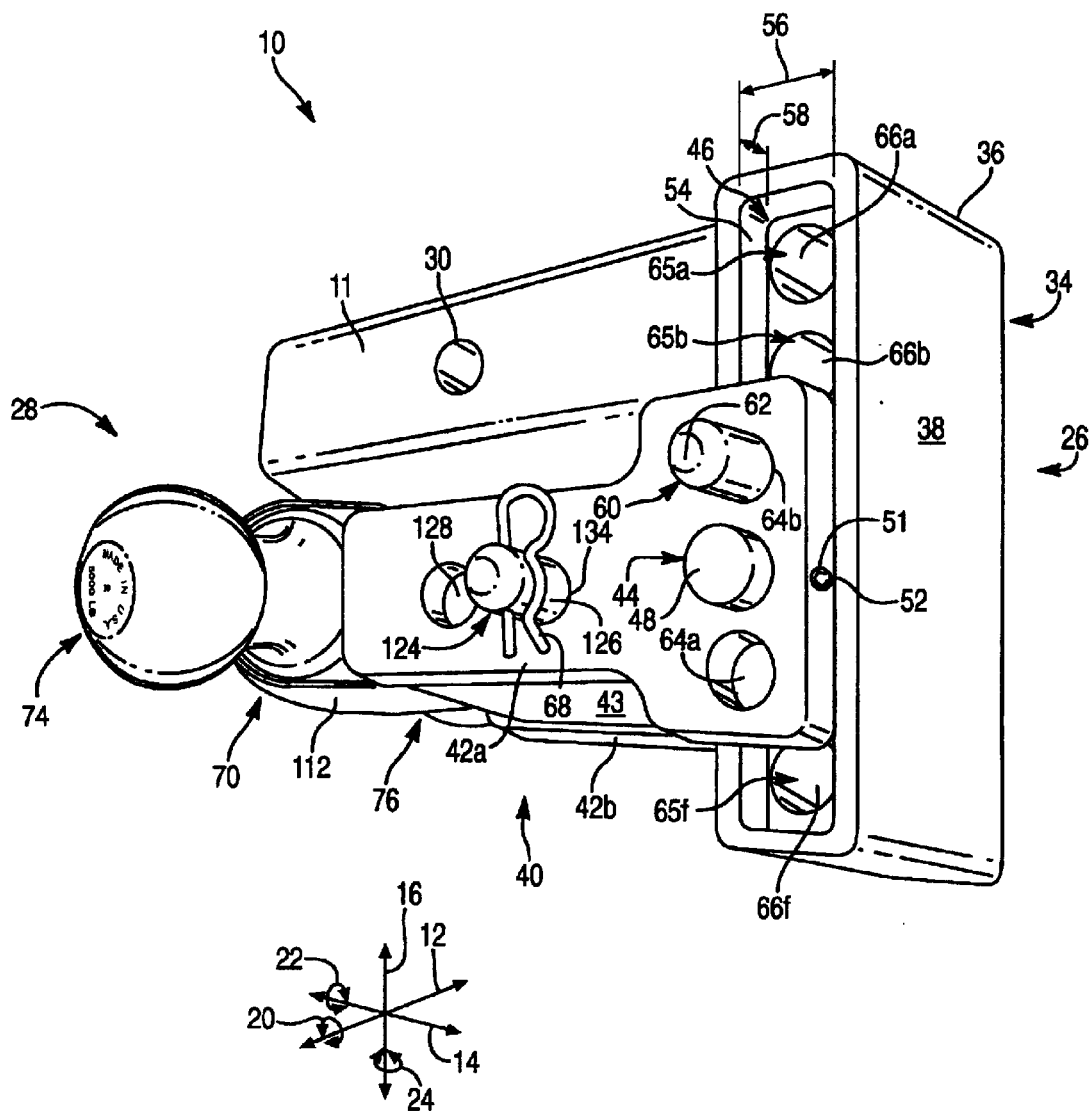
FIG. 2 is a perspective view of the apparatus of FIG. 1 in a stowed position in accordance with the invention.

Referring to FIGS. 1 and 2, an apparatus 10 may include a trunnion 11. The trunnion 11 may define a longitudinal direction 12. Lateral and transverse directions, 14 and 16, respectively, may be defined so that they are substantially mutually orthogonal to each other and to the longitudinal direction 12. Rotational directions 20, 22, and 24 may be defined as rotation about axes parallel to the directions 12, 14, and 16, respectively.

The trunnion 11 may have any suitable cross-section and length. Additionally, the trunnion 11 may have a fastener, lock, or the like, to maintain the trunnion 11 securely fastened to a receiver (not shown), which may be secured to the undercarriage of a vehicle (not shown). In one embodiment, the lock may be a locking aperture 30 admitting a locking pin (not shown) therethrough.

The apparatus 10, and the components thereof, may have a rearward end 26 and a forward end 28. This terminology may be used for convenience to refer to the apparatus 10 from the reference frame of the towing vehicle. Thus, the rearward end 26 extends away from the towing vehicle and forward end 28 extends toward the towing vehicle. In certain embodiments of the present invention, the apparatus 10 and the components thereof are made of steel, however, aluminum, ferrous alloys, or any other material possessing sufficient strength and durability may be used.

An apparatus 10 may include a base 34. The base 34 typically attaches to the rearward end 26 of the trunnion 11 or else to some adapter secured to a vehicle. The base 34 is typically substantially permanently attached to the trunnion 11. In some embodiments, the trunnion 11 may be omitted and the base 34 may secure directly to structures of the towing vehicle. The base 34 may also be embodied as part of the towing vehicle, such as a bumper.

The base 34 may be embodied as a block 36. The block 36 may be attached to the trunnion 11 by means of welds, bolts, rivets, or other means of attachment. In some stowable embodiments of an apparatus 10, the majority of the components may be placed out of view when stowed. In some of such embodiments the most visible portion may be the base 34.

Accordingly, a block 36 may have a concealing surface or face 38 formed thereon. The concealing surface 38 may be formed to be aesthetically pleasing and may, for example, be chromed, painted, decorated, stylistically shaped, or the like. In some embodiments, other components of the apparatus 10 may be located beyond; or concealed by, the concealing surface 38 when in a stowed position in accordance with the invention.

An apparatus 10 may include a mount 40. A mount 40 may include side beams 42a, 42b parallel to one another and secured to a support 43. Alternatively, side beams 42a, 42b may be replaced with a single beam 42 or a similar structure. In some embodiments, the support 43 may be embodied as a platform or other structure suitable for providing structural support to the mount 40 and providing an attachment structure for a hitch or other components of the apparatus 10.

Beams 42a, 42b may attach to the support 43 by any attachment means capable of supporting the magnitude of forces developed while towing a trailer. In one embodiment, the beams 42a, 42b are attached to the support 43 by means of welds, but may be attached by fasteners such as bolts, rivets or the like. Alternatively, the mount 40 may be formed as a monolithic member comprising surfaces and extensions providing the same functionality as a support 43 and side beams 42a, 42b.

The mount 40 may secure to the base 34 in a variety of ways. The mount 40 may be secured to the base 34 in a manner allowing for no movement of the mount 40 relative to the base 34. The mount may be integrally attached to the base 34. The base 34 and mount 40 may be pan of the same monolithic piece of material, or the mount 40 may be attached by means of welds, bolts, or any other suitable securement means.

The mount 40 may be secured to the base 34 in a manner allowing for movement of the mount 40 relative to the base 34. In some embodiments of the apparatus 10, the mount 40 may be pivotably attached to the base 34. The mount 40 may pivot about any suitable axis with respect to the base 34 between at least one deployed position and at least one stowed position. In certain embodiments of the apparatus 10, the mount 40 and base 34 may be configured to allow the mount 40 to translate relative 10 the base 34. In certain embodiments, the mount 40 may be selectively lockable to the base 34 in any of a plurality of fixed positions, orientations, or both.

The base 34 and the mount 40 may be coupled by a pivot 44, allowing the mount 40 to rotate relative to the base 34. The base 34 and mount 40 may also be coupled by a guide 46. The guide 46 may provide for translation of the mount 40 relative to the base 34. The guide 46 may be integrally or monolithically attached to the base 34 and engage pivots 44, or another engagement member, engaging the mount 40. Alternatively, the guide 46 may be integrally attached to the mount 40 or be monolithically formed with the mount 40 to engage pivots 44, or another engagement member, engaging the base 34.

In the embodiment shown, a pivot 44 may be embodied as pivot studs 48 extending through pivot apertures 50 formed in the side beams 42a, 42b. The pivot studs 48 may be secured to the side beams 42a, 42b, such as by a press pin 51 inserted into a press pin aperture 52 (FIG. 2).

The guide 46 may be embodied as slots 54 formed in the block 36. The slots 54 typically extend along a transverse direction 16. A slot 54 may have a width 56 in a longitudinal direction 12 and a depth 58 in a lateral direction 14. The studs 48 are typically of sufficient length to extend through the apertures 50 and into slots 54 a distance slightly less than the depth 58 of the slot 54. The studs 48 are typically of suitable dimensions to allow them to rotate and translate substantially freely within the slots 54.

An apparatus 10 may also include a lock 60. A lock 60 may prevent motion of the mount 40 in at least one direction 12–24, relative to the base 34, when engaged. The lock 60 may engage a height adjustment locator 65a–65f formed in the base 34. The height adjustment locators 65a–65f may provide for the mount 40 to be secured at different locations on the base 34, thereby providing height adjustability. Any workable number of height adjustment locators 65a–65f may be formed in the base 34.

A lock 60 may be embodied as a pin 62 extending through either of the apertures 64a–64c in the side beam 42a. A height adjustment locator 65a–65f may be embodied as an aperture 66a–66f, groove, or any formation capable of engaging a pin 62. A pin 62 may also extend through an aperture 66a–66f in the block 36, and through an aperture 64a–64c in the side beam 42b.

Apertures 66a–66f typically extend through the block 36 in a lateral direction 14. Apertures 66a–66f may have substantially similar dimensions and be distributed in a column extending in a transverse direction 16.

A pin 62 extending through an aperture 64a–64c and an aperture 66a–66f effectively prevent the translation of the mount 40 relative to the base 34. Two pins 62 may be inserted through the apertures 64a–64c and two apertures 66a–66f when towing heavy loads in order to increase the bearing surface and material transferring loads between the mount 40 and the base 34.

In the embodiment shown, a pin 62 may also function along with a stud 48 to effectively prevent rotation of the mount 40 relative to the base 34. The extension of the stud 48 into the slot 54 and the presence of a pin 62 passing through an aperture 64a–64c and an aperture 66a–66f prevent the rotation of the side beams 42a, 42b with respect to the block 36 in the direction 22 (e.g., about an axis in the lateral direction 14). A pin 62 may be retained by a lynch pin or another type of fastener.

The mount 40 may pivot with respect to the base 34 between at least one deployed position and at least one stowed position. With all locks 60 disengaged, the mount 40 is left to swing freely about the pivot 44. The mount 40 may be rotated about the pivot 44 and moved toward the forward end 28 of the apparatus 10 for stowage.

For the embodiment of FIGS. 1 and 2, a lock 60 may be used to lock the mount 40 in a deployed position relative to the base 34. The lock 60 may be disengaged and the mount 40 rotated about the pivot 44 toward the rearward end 26 to position the mount 40 in a deployed position. For example, a pin 60 may be inserted into an aperture 64a–64c in the side beam 42a, through an aperture 66a–66f in the block 36 and through an aperture 64a–64c in the side beam 42b, thereby fixing the position of the side beams 42a, 42b in the deployed position of FIG. 1.

Referring to FIG. 2, a lock 60 may be used to lock the mount 40 in a stowed position. The lock 60 may be disengaged and the mount 40 rotated toward the forward end 28. In some embodiments, a pin 62 may be inserted through an aperture 64a–64c in the side beam 42a, through an aperture 66a–66f in the block 36 and through an aperture 64a–64c in the side beam 42b thereby fixing the position of the side beams 42a, 42b in the stowed position of FIG. 2.

An apparatus 10 may also have a fastening portion 70 configured to receive one or more hitches 74, 76. The fastening portion 70 may be secured to the support 43 or may secure directly to the mount 40. The fastening portion 70 may be secured to the mount 40 by means of a pivot 72 enabling the fastening portion 70 to pivot with respect to the mount 40. Alternatively, the fastening portion 70 may be monolithically, integrally, or even homogeneously formed with the mount 40, with the hitch 74, or both.

The fastening portion 70 may have a stop 78 configured to engage a hitch 74 in a manner to resist rotation of the bitch 74 with respect thereto. A stop 78 may allow a nut to be tightened without requiring user intervention to prevent the rotation of the hitch 74 with respect to the mount 40, thereby reducing the number of tools and hands needed to attach the hitch 74 to the fastening portion 70. In one embodiment, the stop 78 is a surface 80 formed to correspond to a surface 82 on the hitch 74. The surfaces 80, 82 may be flat, or may have any other contour capable of resisting rotation of the hitch 74.

In certain embodiments, an apparatus 10 may include a hitch 74 such as one that may attach directly to a fastening portion 70. The hitch 74 may be a ball hitch 74, a pintle hitch 74, or any other type of hitch 74 suitable for serving as an attachment point for a tongue of a trailer or other towed vehicle. In some embodiments, one or more additional hitches 76 may secure to the fastening portion 70.

Figure 3:
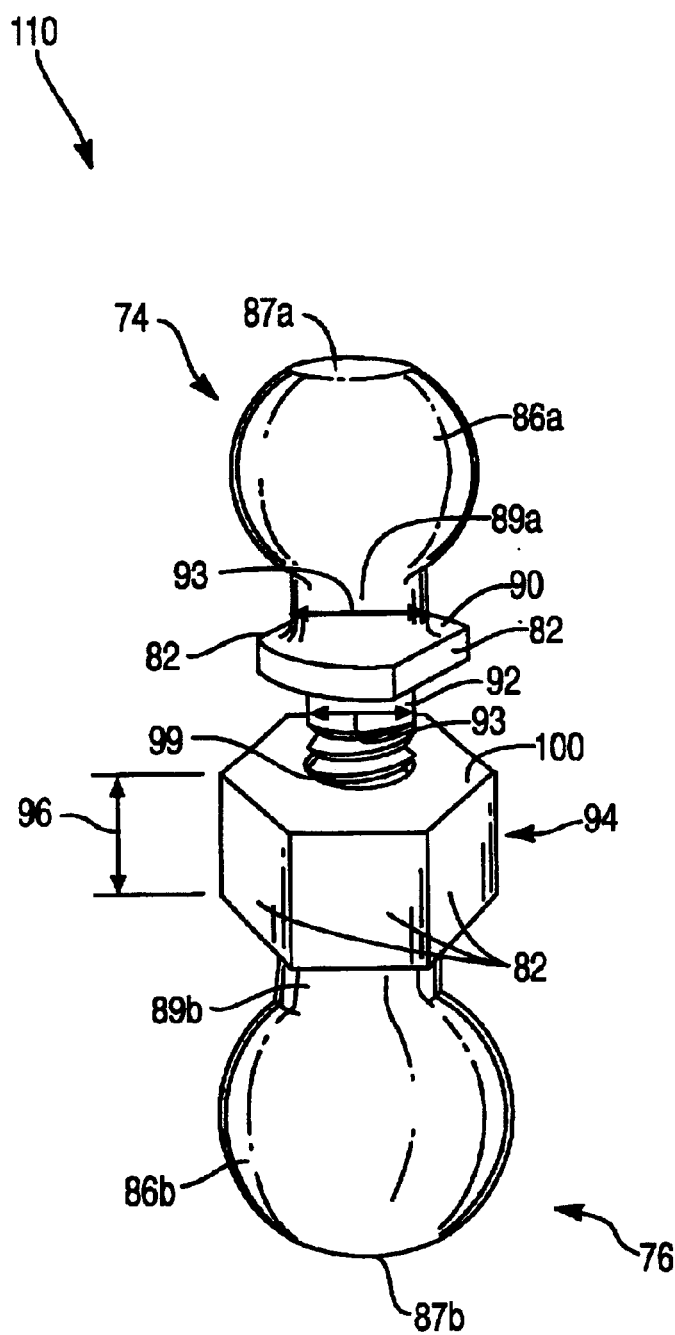
FIG. 3 is a perspective view of selected hitches suitable for use with various embodiments and apparatus in accordance with the present invention.

Referring to FIG. 3, while continuing to refer to FIGS. 1 and 2, a hitch 74, 76 may include surfaces 82 configured to receive a wrench or engage a surface 80 for resisting or preventing turning of the hitch 74, 76 during securement to a supporting surface. The surfaces 82 may be embodied as flats and may be arranged to form a polygon such as a standard hexagon. Alternatively, two flats located adjacent or opposite one another may be used as surfaces 82.

A hitch 74, 76 may have a ball 86a, 86b. The ball 86a, 86b may have a flat 87a, 87b providing space for a label identifying the load rating and other significant information about the hitch 74, 76. The ball 86a, 86b may be secured to a neck or shank 89a, 89b. The shank 89a may be secured to a flange or base 90. The ball 86a and shank 89a may be integrally (i.e., fixed as an assembled unit), monolithically (i.e., a single, nondisassemblable piece), or homogeneously (i.e., formed simultaneously as a single piece out of a single piece of material) formed with one another.

A stud or bolt 92 may be secured to the flange 90. The stud 92 may be integrally, monolithically, or homogeneously formed with the ball 86a, neck 89a, and flange or base 90 of a hitch 74. The stud 92 may secure the hitch 74 to a suitable fastening portion 70 for towing. The stud 92 may also be threaded. In certain embodiments, the stud 92 and neck 89a may be of approximately the same size 93 in order to provide equal strength and to reduce stress concentrations that may otherwise occur with substantial abrupt changes in cross-section.

A hitch 76 may have a pedestal 94 having a height 96. The ball 87b, neck 89b, and pedestal 94 may be integrally, monolithically, or homogeneously formed with one another. The pedestal 94 may appear oversized in contrast to the base 90. The base 90 acts primarily to register the hitch 74 and stud 92 with respect to a fastening portion 70, while also supporting a loading couple occasioned by radial loads on the ball 86a.

Unlike the flange 90 of the hitch 74, the pedestal 94 need not have a stud 92 formed to receive a nut for securement to a mount. Instead, the pedestal 94 may be formed to have a height 96 or length for receiving a substantial portion of the stud 92. Accordingly, the pedestal 94 may have a threaded aperture 99 that acts as a nut to receive the stud 92.

The pedestal 94 is formed to have a cross-sectional area 100 effective to support the stresses imposed by the stud 92. The cross-sectional area 100 of the pedestal 94 is sufficient to distribute stresses between the stud 92 and the neck or shank 89b, without radical changes in axial cross-sectional area 100. For example, the neck 89b cannot usually simply be bored to receive threads directly. Such an undermining of the neck 89b severely restricts the load rating for which the hitch 76 may be rated. Instead, the continuity of material and the stress distributions extend from the shank 89a through the stud 92 to the pedestal 94 and neck 89b. Thus, the ball 86a and the ball 86b may be supported at their full rated load, as if each were a single ball hitch having its own original rating in accordance with its size and conventional standards.

Figure 4:
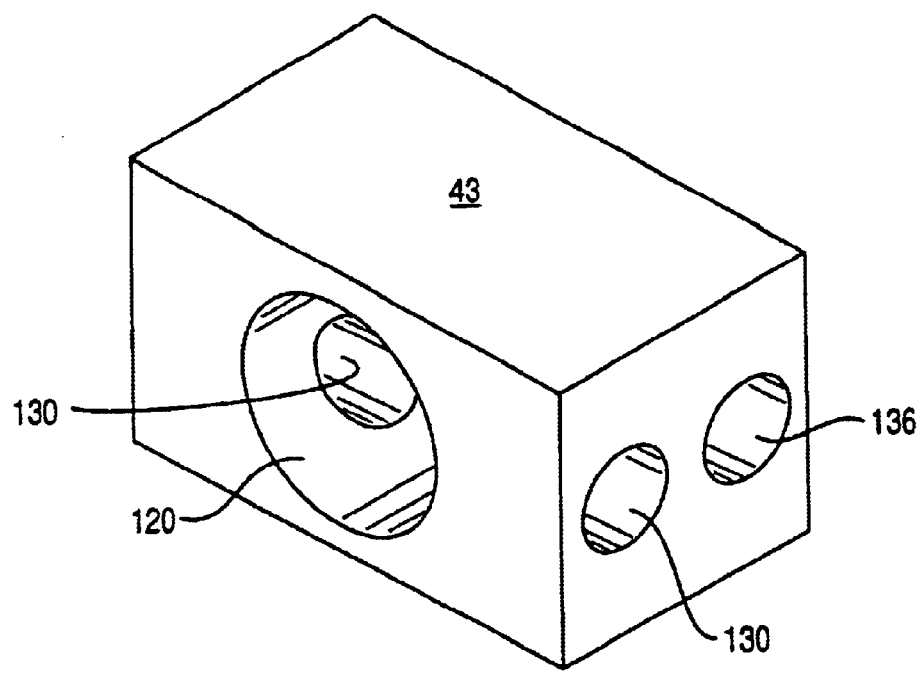
FIG. 4 is a perspective view of one embodiment of a platform portion of a mount in accordance with the invention.
Figure 5:
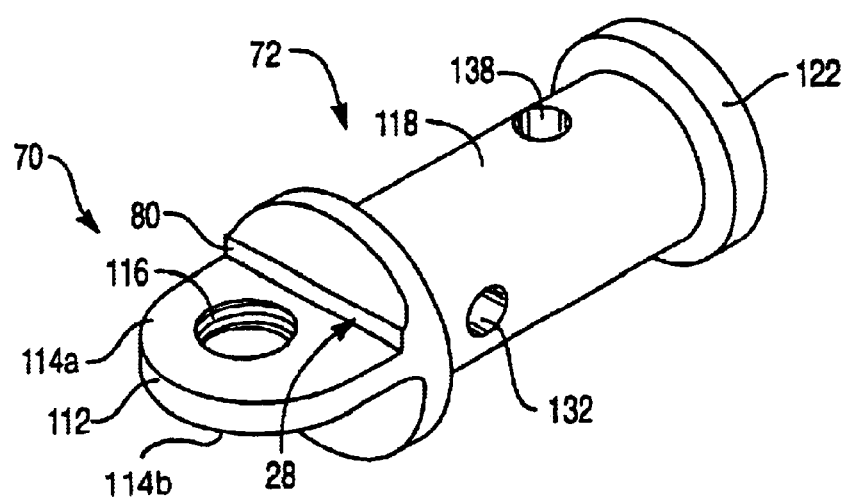
FIG. 5 is a perspective view of one embodiment of a fastening portion and a pivot in accordance with the invention.

Referring to FIGS. 4 and 5, while referring generally to FIGS. 1–3, the fastening portion 70 may be embodied as a turntable 112 having a plurality of surfaces 114a, 114b formed thereon, which may serve as points of attachment for a hitch 74, or one or more additional hitches 76. In one embodiment there may be two surfaces 114a, 114b. The surfaces 114a, 114b may have an aperture 116 therethrough sized to receive a stud or bolt 92 used for mounting a hitch 74 or hitches 74, 76.

For example, the stud 92 may extend through the aperture 116 and into the threaded aperture 99 effectively securing the hitches 74, 76 to the turntable 112. Alternatively, the aperture 116 may be threaded to receive the threaded stud 92. A nut or other fastener may be used to engage the stud 92 and secure it to the turntable 112. The hitch 74 or hitches 74, 76 may alternatively be secured to the surfaces 114a, 114b by welds or other suitable securement means.

The pivot 72 may be embodied as a shaft 118 secured to the turntable 112. The turntable 112 may secure to the shaft 118 by threads, welds, bolts, rivets, or other securement means. The turntable 112 may also be monolithically formed with the shaft 118. The shaft 118 may extend through an aperture 120 formed in the support 43. The shaft 118 and aperture 120 are typically sized such that the shaft 118 may rotate substantially freely within the aperture 120. The shaft 118 may receive a retainer 122, such as a snap ring, end cap, nut, or the like, protecting the shaft 118 against removal from the aperture 120.

The shaft 118 and turntable 112 may rotate in order to orient a particular hitch 74, 76 to a position suitable for towing, stowing or the like. For example, in FIG. 1, the hitch 74 is oriented suitably for attaching to a conventional trailer tongue attachment mechanism. The turntable 112 may be rotated a half turn in order to orient hitch 76 suitably for attachment to a conventional trailer tongue attachment mechanism.

The apparatus 10 may include a lock 124, which enables a user to selectively prevent rotation of the turntable 1112. The lock 124 may comprise a pin 126, which may be inserted into an aperture 128 in the side beam 42a, the aperture 130 in the support 43, aperture 132 in the shaft 118, and another aperture 128 in the side beam 42b in order to lock the turntable 112 in deployed positions (i.e., either hitch 74 or 76 oriented suitably for attachment to a conventional trailer attachment), as in FIG. 1. The pin 126 may be inserted through a corresponding aperture in the side beam 42a, the aperture 136 in the support 43, the aperture 138 in the shaft 118, and another aperture 134 in the side beam 42b in order to lock the turntable 112 in a stowed position as in FIG. 2. Placement of the hitches 74, 76 in a stowed position relative to the mount and base allows the mount 40 to be oriented as shown in FIG. 2 without the hitches 74, 76 interfering with the trunnion 112.

Figure 6:
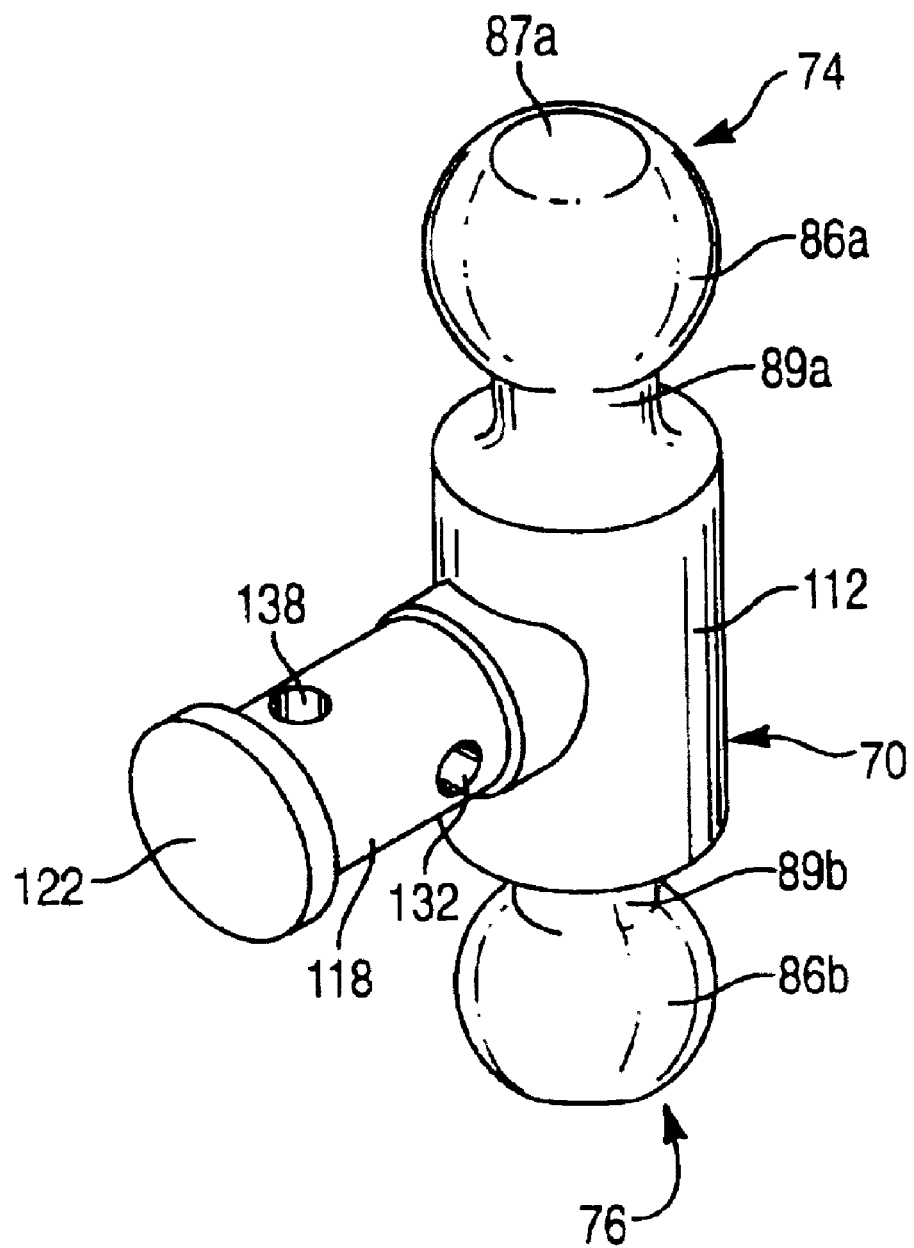
FIG. 6 is a perspective view of an integrated fastening portion and hitches in accordance with the invention.

Referring to FIG. 6, in one embodiment of the apparatus 10, the hitch 74 may be integrally attached to the turntable 112. The hitch 74 may also be monolithically, integrally, or homogeneously formed with the turntable 112. Other hitches 76 may also be similarly formed or attached to the turntable 112.

Figure 7:
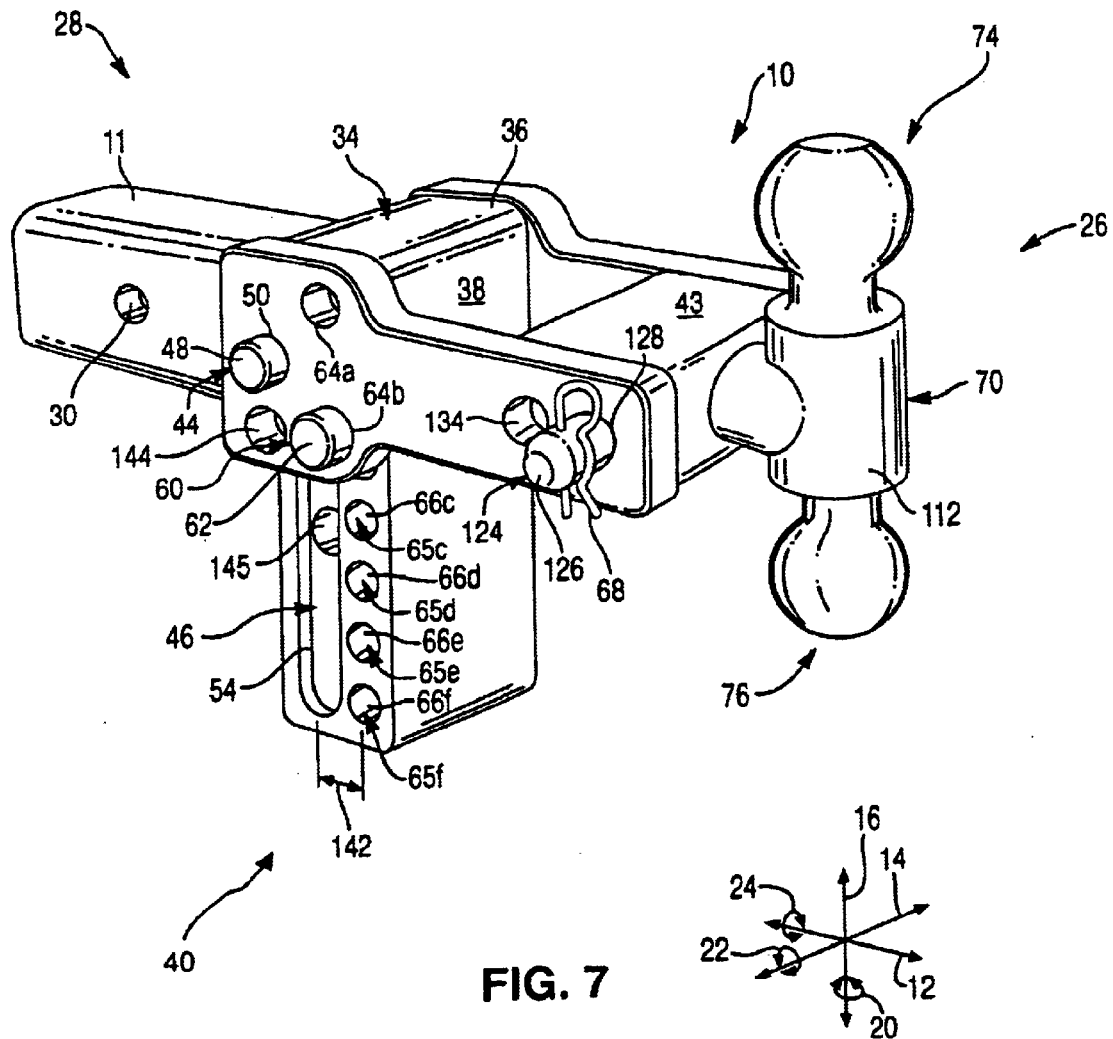
FIG. 7 is a perspective view of an alternative embodiment of a hitch system having a guide offset from the height adjustment locators in accordance with the invention.
Figure 8:
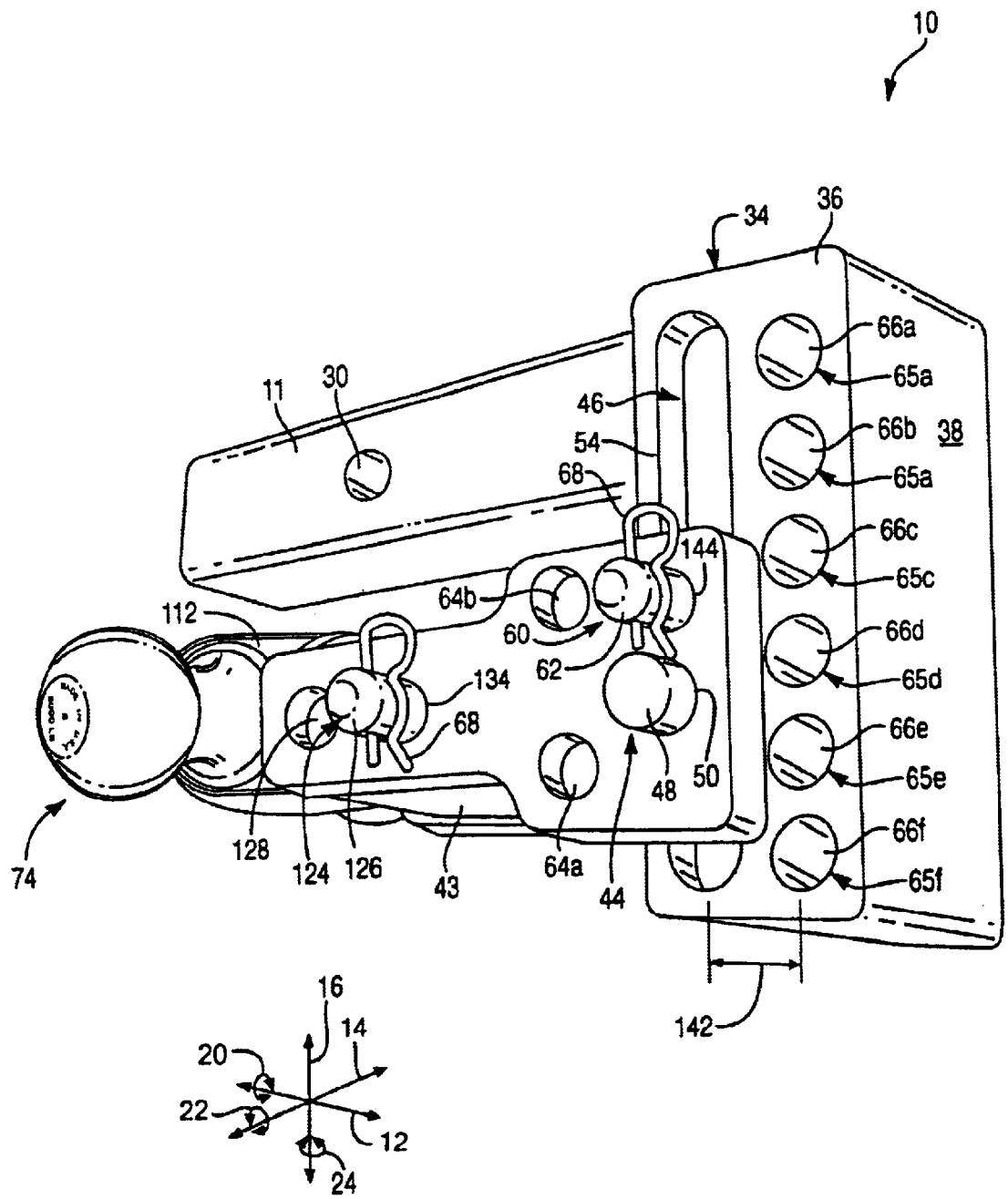
FIG. 8 is a perspective view of the apparatus of FIG. 7 in a stowed position in accordance with the invention.

Referring to FIGS. 7 and 8, in some embodiments the guide 46 may be offset from the height adjustment locators 65a–65f a distance or offset 142. For example, the slots 54 may be offset from the row of apertures 66a–66f by a distance 142 along an axis in the longitudinal direction 12. For the apparatus of FIGS. 7 and 8, the offset 142 provides for a less compact, but stronger, block 36 by avoiding reduction of the effective cross-sectional area resulting from apertures 66a–66f and slots 54 lying in or centering on substantially the same plane. Towing heavy loads may require that the offset 142 be present, whereas lighter towing loads may not. To accommodate the offset 142, the pivot aperture 50 may be offset a substantially identical distance 142 from the apertures 64a–64c.

Offsetting the apertures 66a–66f from the slots 54 may prevent the concentric positioning of the apertures 64a–64c with the apertures 66a–66f when the mount 40 is in a stowed position. Accordingly, a stowage aperture 144 may be formed in the side beams 42a, 42b positioned to be concentric with a stowage aperture 145 formed in the block 36. The stowage aperture 145 may be colocated with the slot 54. A pin 62 may be inserted through the aperture 144 in the side beam 42a, through the aperture 145 in the block 36, and through the aperture 144 of the side beam 42b in order to fix or lock the mount 40 in a stowed position as in FIG. 8.

Figure 9:
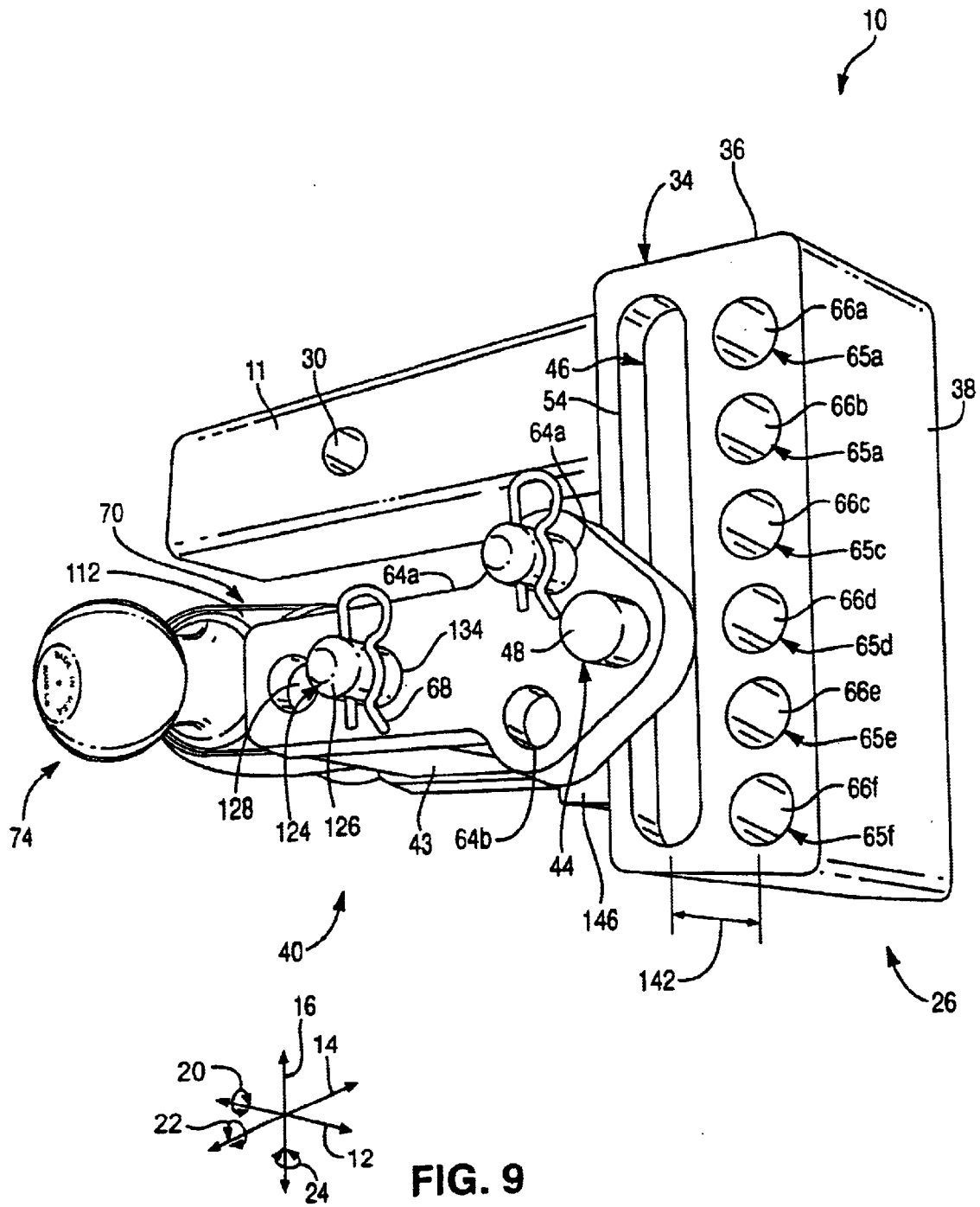
FIG. 9 is a perspective view of an alternative embodiment of a hitch system having an offset stowage aperture in accordance with the invention.

Referring to FIG. 9, some embodiments may offset the aperture 145 a similar distance 142 from the slot 54, but in the opposite direction of the offset of the apertures 66a–66f from the slot 54. In this manner the apertures 64a–64c may be relied upon to receive a pin when locking the mount 40 in the stowed position. In some cases a stowage block 146 may be secured to the block 36 and have the stowage aperture 145 formed therein. A stowage block 146 uses less material than would extending the block a sufficient distance to have a correctly positioned stowage aperture 145 formed therein. A stowage block 146 need not be very large or strong due to the fact that it need only carry the weight of the other components of the apparatus 10 and withstand inertial forces resulting from various accelerations and shocks of a vehicle.

Figure 10:
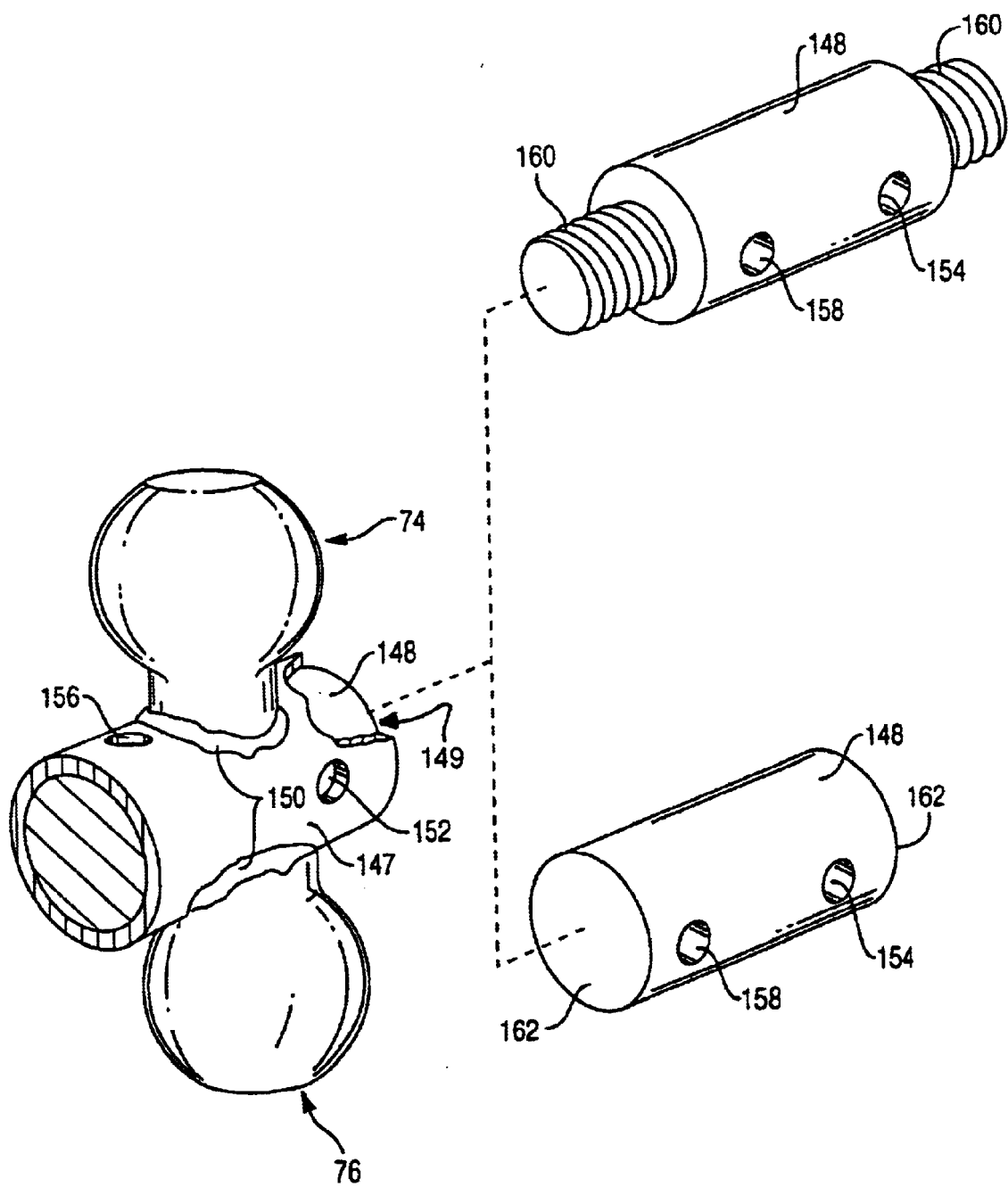
FIG. 10 is a perspective view of one embodiment of a fastening portion shown with two embodiments of a pivot in accordance with the invention.
Figure 11:
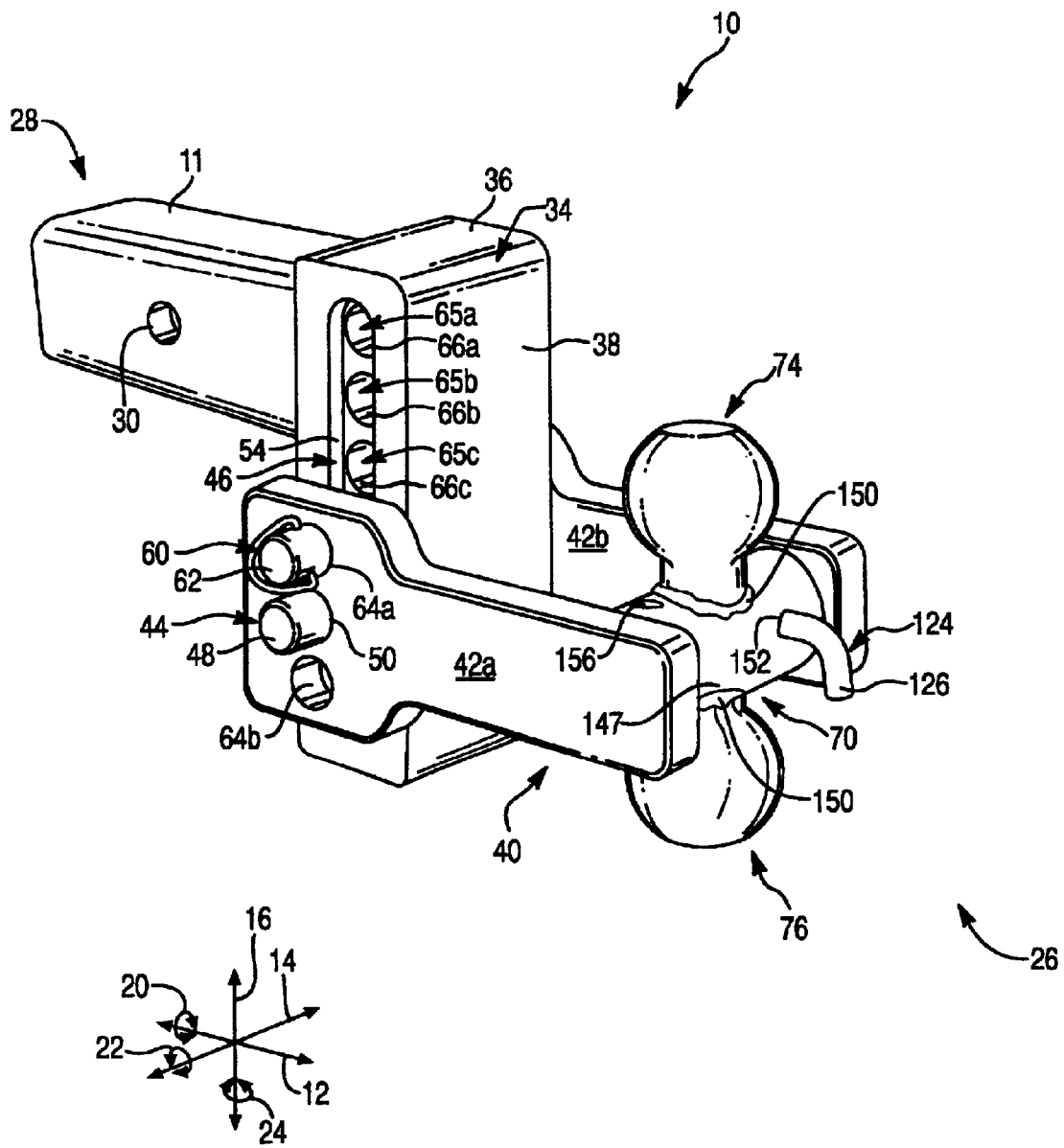
FIG. 11 is a perspective view of a hitch system with the fastening portion of FIG. 10.

Referring to FIG. 10, a fastening portion 70 may be embodied as a cylinder 147, or, equivalently, any suitable member having an aperture extending therethrough, such as a block, or the like. In such an embodiment, the pivot 72 may be embodied as a spindle 148 secured to the mount 40. A hitch 74, or hitches 74, 76 may secure to the cylinder 147 by welds 150 or may be formed monolithically, integrally, or homogeneously with the cylinder 147.

In some embodiments, the spindle 148 may be a shaft extending between the two side beams 42a, 42b and through the aperture 149 in the block or cylinder 147. The spindle 148 is typically sized such that it may rotate substantially freely within the aperture 149. The spindle 148 may have threaded portions 160 formed thereon. The threaded portions 160 may thread into the side beams 42a, 42b or may pass through apertures formed in the side beams 42a, 42b and engage nuts or other fasteners. Alternatively, the spindle 148 may be a shaft with ends 162 welded to the side beams 42a, 42b.

Figure 12:
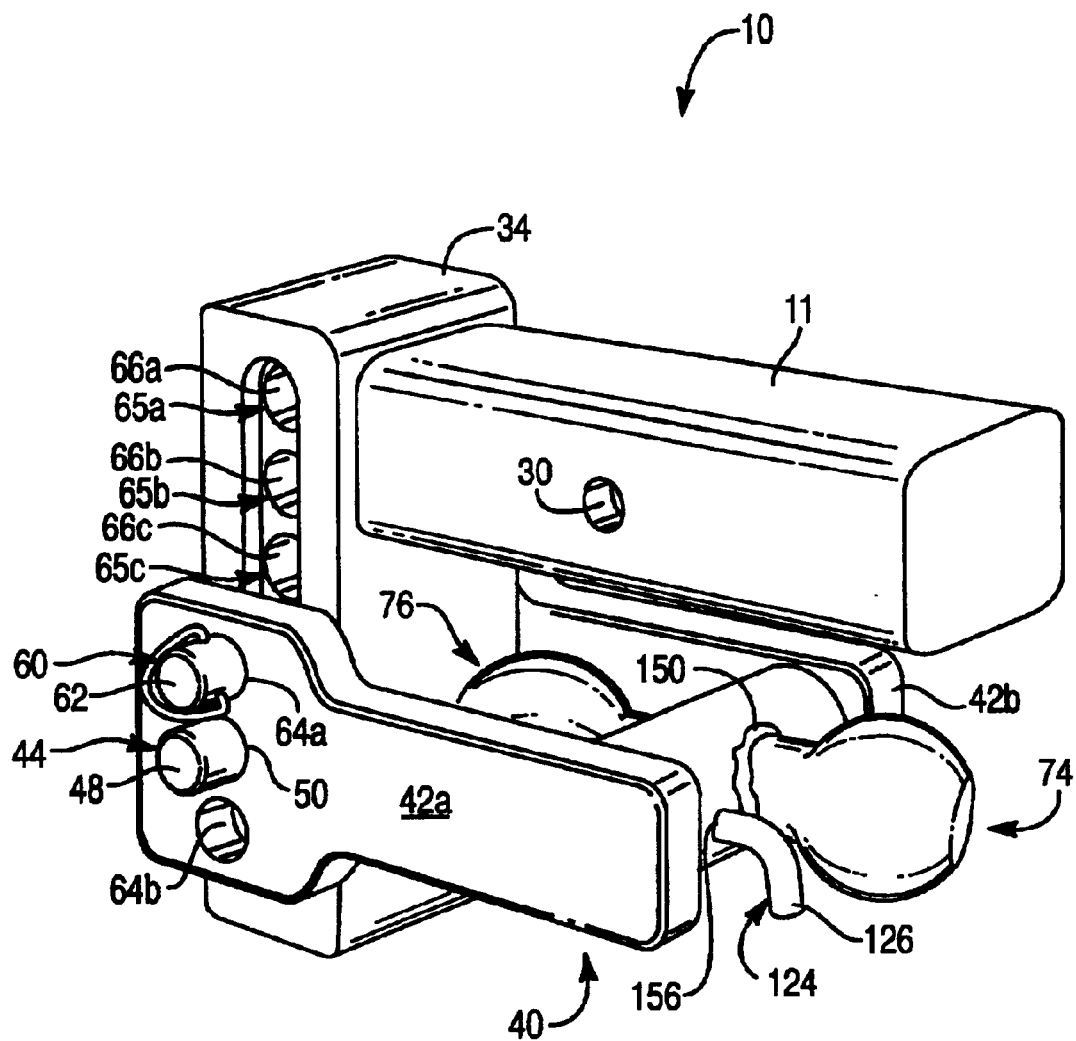
FIG. 12 is a perspective view of the apparatus of FIG. 11 in a stowed position.
Figure 12:
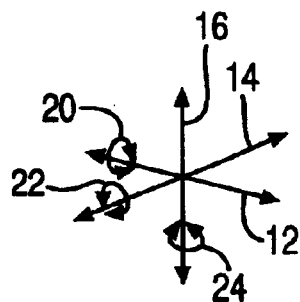

A lock 124 may still be embodied as a pin 126. The locking pin 126 may extend through an aperture 152 in the cylinder 147 and an aperture 154 in the spindle 148, locking the fastening portion 70 with the hitch 74 in a deployed position as in FIG. 11. Due to the symmetry of the cylinder, the cylinder may be rotated substantially 180 degrees in order to concentrically position the apertures 152, 154 suitable for locking the hitch 76 in a deployed position. A lynch pin 68, or the like, may be used to prevent removal of the pin 126. The pin 126 may insert into an aperture 156 in the cylinder and an aperture 158 in the spindle 148 in order to lock the fastening portion 70 in a stowed position as depicted in FIG. 12.

Referring to FIGS. 13A–13C, 14, and 15, the fastening portion 70 may be embodied as a platform 166. The pivot 72 may be embodied as a pin extending through the platform 166. A lock pin 126 may still be relied upon to fix the position of the platform 166 with respect to the side beams 42a. 42b. The hitch 74 or hitches 74, 76 may be secured to the platform 166 by a variety of means, such as a weld 150, nut, or other suitable fastener.

Figure 13A:
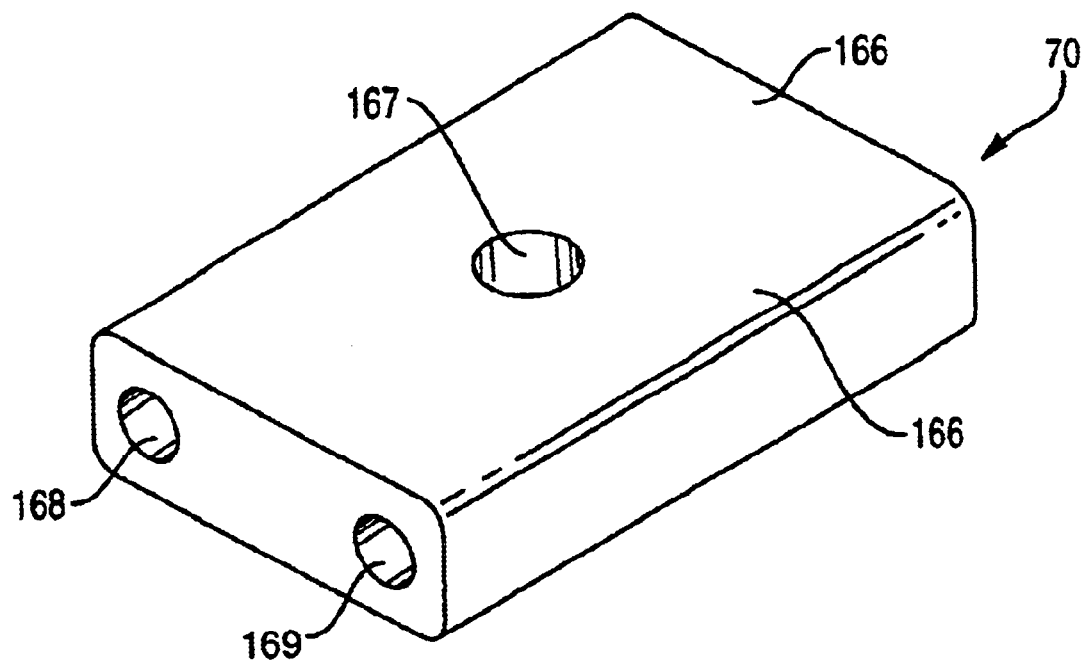
FIGS. 13A–13C are perspective views of different embodiments of fastening portions embodied as platforms in accordance with the invention.

Referring to FIG. 13A, a platform 166 may have an aperture 167 formed therein to receive a stud 92. The aperture 167 may be threaded such that a threaded stud 92 may screw into the aperture 167. The stud 92 may be inserted through the aperture 167 and engage the threaded aperture 99 of a hitch 76. The platform 166 may have a pivot aperture 168 and a locking aperture 169 formed therein.

Figure 13B:
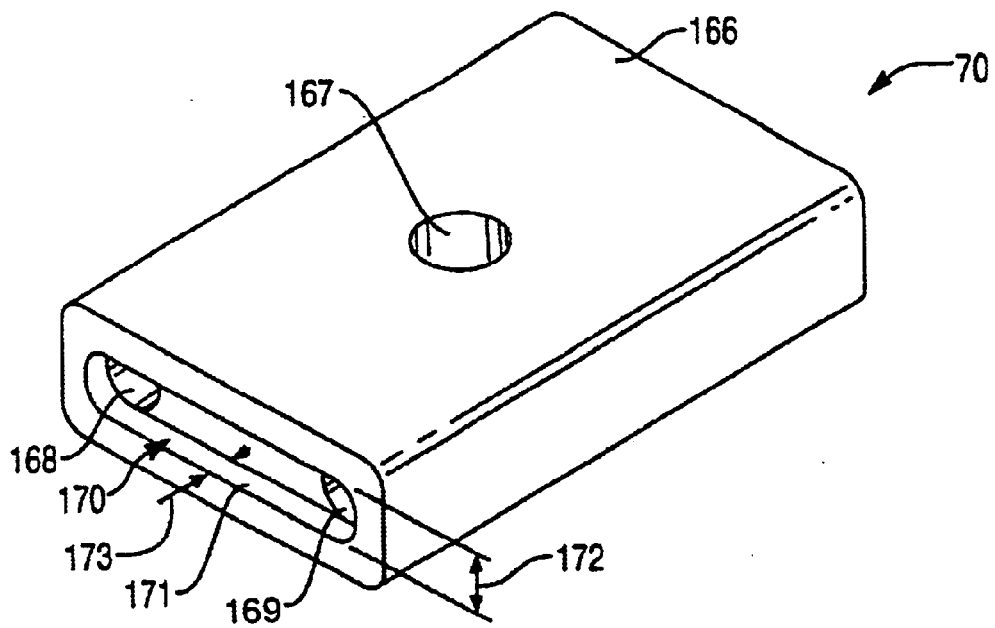
Figure 14:
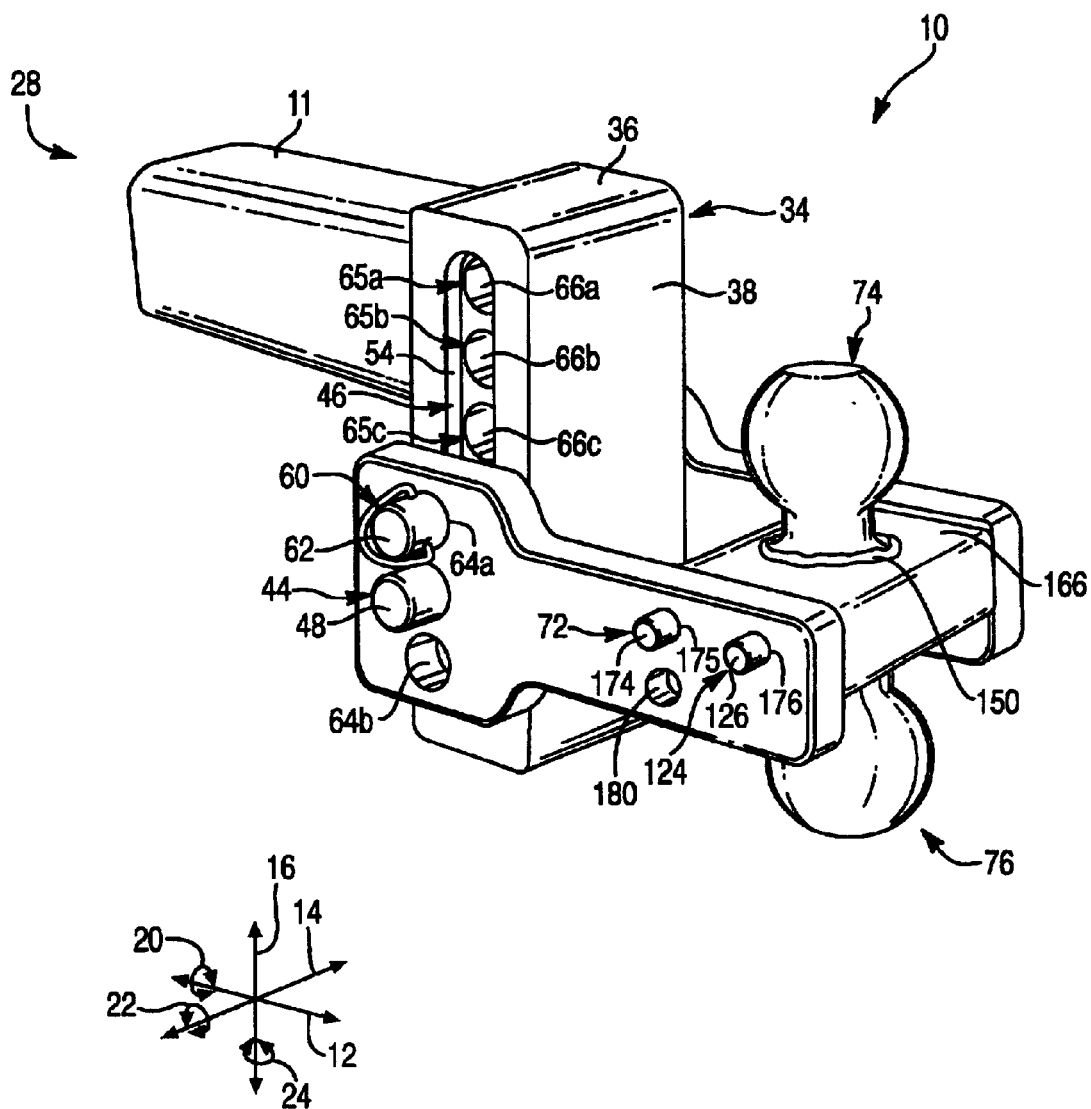
FIG. 14 is a perspective view of a hitch system with a fastening portion embodied as a platform in accordance with the invention.

Referring to FIG. 13B, the fastening portion 70 and mount 40 may be secured to one another by a guide 170 engaging the pivot 72. The pivot 72 may translate along the guide 170. The guide 170 may be embodied as slots 171 having a width 172 and a depth 173 formed on the sides of the platform 166. As depicted in FIG. 14, the pivot 72 may be embodied as studs 174 that extend through apertures 175 formed in the side beams 42a, 42b and into the slots 171 of the platform 166.

Figure 13C:
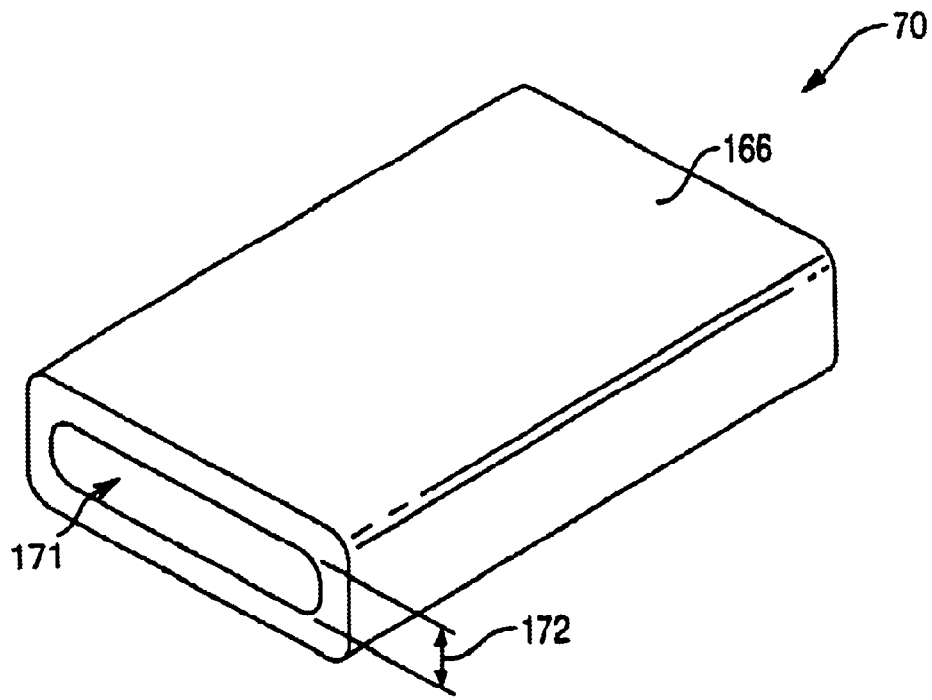

Referring to FIG. 13C, a guide 170 may be embodied as a single slot 171 extending completely through the platform 166. For the platform of FIG. 13C, the pivot 72 may be embodied as pivot studs 174 or as a single pin extending completely through the platform 166, as better seen in FIG. 14.

Figure 15:
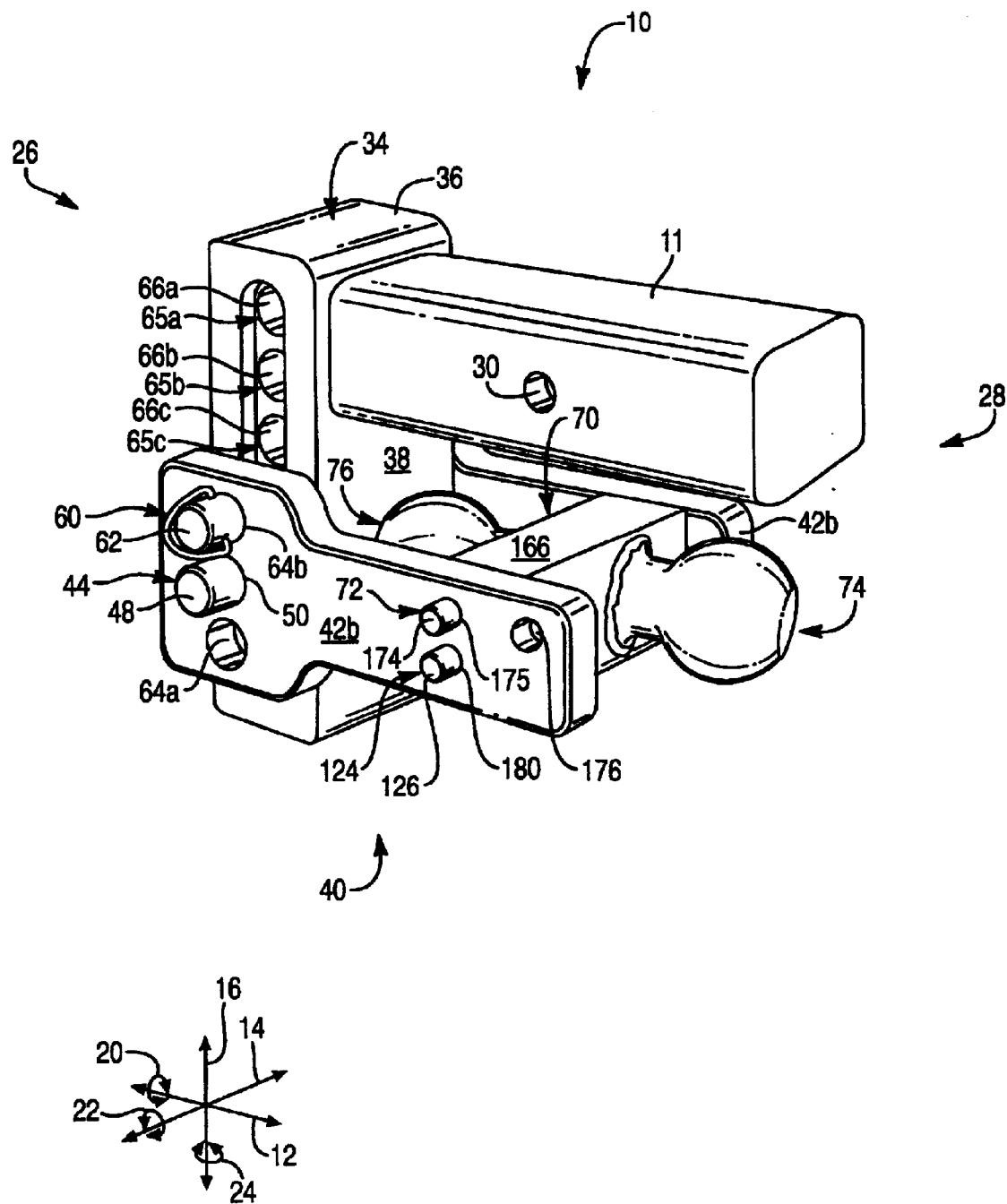
FIG. 15 is a perspective view of the apparatus of FIG. 14 in a stowed position in accordance with the invention.

Referring to FIGS. 14 and 15, for the embodiment of a platform 166 of FIG. 13A, a locking pin 126 may be inserted through an aperture 178 in the side beam 42a, through a pivot aperture 168 in the platform 166, and through the locking aperture 176 in the side beam 42b to lock the hitch 74 in a position suitable for attachment to a trailer as in FIG. 14. The locking pin 126 may be inserted through the aperture 180 in the side beam 42a, through the locking aperture 169 in the platform 166, and through the locking aperture 176 in the side beam 42b in order to lock the hitch 74 or hitches 74, 76 in a stowed position, as in FIG. 15.

For the embodiment of FIG. 13B, a locking pin 126 may be inserted through a locking aperture 176 in the side beam 42a, through a locking aperture 169 in the platform 166, and through the locking aperture 176 in the side beam 42b to lock the hitch 74 in a position suitable for attachment to a trailer. The platform 166 may be rotated about the pivot studs 174 and translated along the slots 171 to orient the hitch 76 suitable for towing a vehicle. When securing a trailer to the hitch 76, the pin 126 typically extends through the pivot aperture 168. The locking pin 126 may be inserted through the aperture 180 in the side beam 42a, through the pivot aperture 168 or the locking aperture 169 in the platform 166, and through the aperture 180 in the side beam 42b in order to lock the platform 166 in a stowed position.

For the embodiment of a platform 166 of FIG. 13C, the locking pin 126 may extend through the locking aperture 176 in the side beam 42a, through the slot 171, and through the locking aperture 176 in the side beam 42b to lock either the hitch 74 or hitch 76 in a deployed position, depending on how the platform 166 is oriented. The locking pin 126 may extend through the aperture 180 in the side beam 42a, through the slot 171, and through the aperture 180 in the side beam 42b to lock both the hitch 74 and hitch 76 in a stowed position, irrespective of the orientation of the platform 166.

For the embodiments of an apparatus 10 of FIGS. 14 and 15, the apertures 175 and 176 may be spaced apart from one another in the longitudinal direction 12. Accordingly, the pivot and locking apertures 168, 169 are spaced apart from one another in the longitudinal direction 12 when the hitch 74, or hitches 74, 76, are in a deployed position. For embodiments of the platform 166 having a slot 171, or slots 171, the slot 171 typically extends in the longitudinal direction 12 when the platform 166 is in a deployed position.

The apertures 175 and 180 may be spaced apart from one another in the transverse direction 16. Accordingly, the pivot and locking apertures 168, 169 are spaced apart from one anotherin the transverse direction 16 when the hitch 74, or hitches 74, 76, are in a stowed position. For embodiments of the platform 166 having a slot 171, or slots 171, the slot 171 typically extends in the transverse direction 16 when the platform 166 is in a stowed position.

Referring to FIGS. 16A–16C and 17–24, a hitch 74 or hitches 74, 76 may be formed integrally, monolithically, or homogeneously with the fastening portion 70. The fastening portion 70 may be embodied as a base 202 either fastened to a hitch 74, or hitches 74, 76, or monolithically formed with a hitch 74 or hitches 74, 76. The base 202 may have faces 204 formed therein to provide for sufficient bearing area for the transfer of loads between the hitch 74 and the mount 40. The pivot and locking apertures 168, 169 may be spaced apart in the transverse direction 16 for a hitch 74 in a deployed position.

Figure 16A:
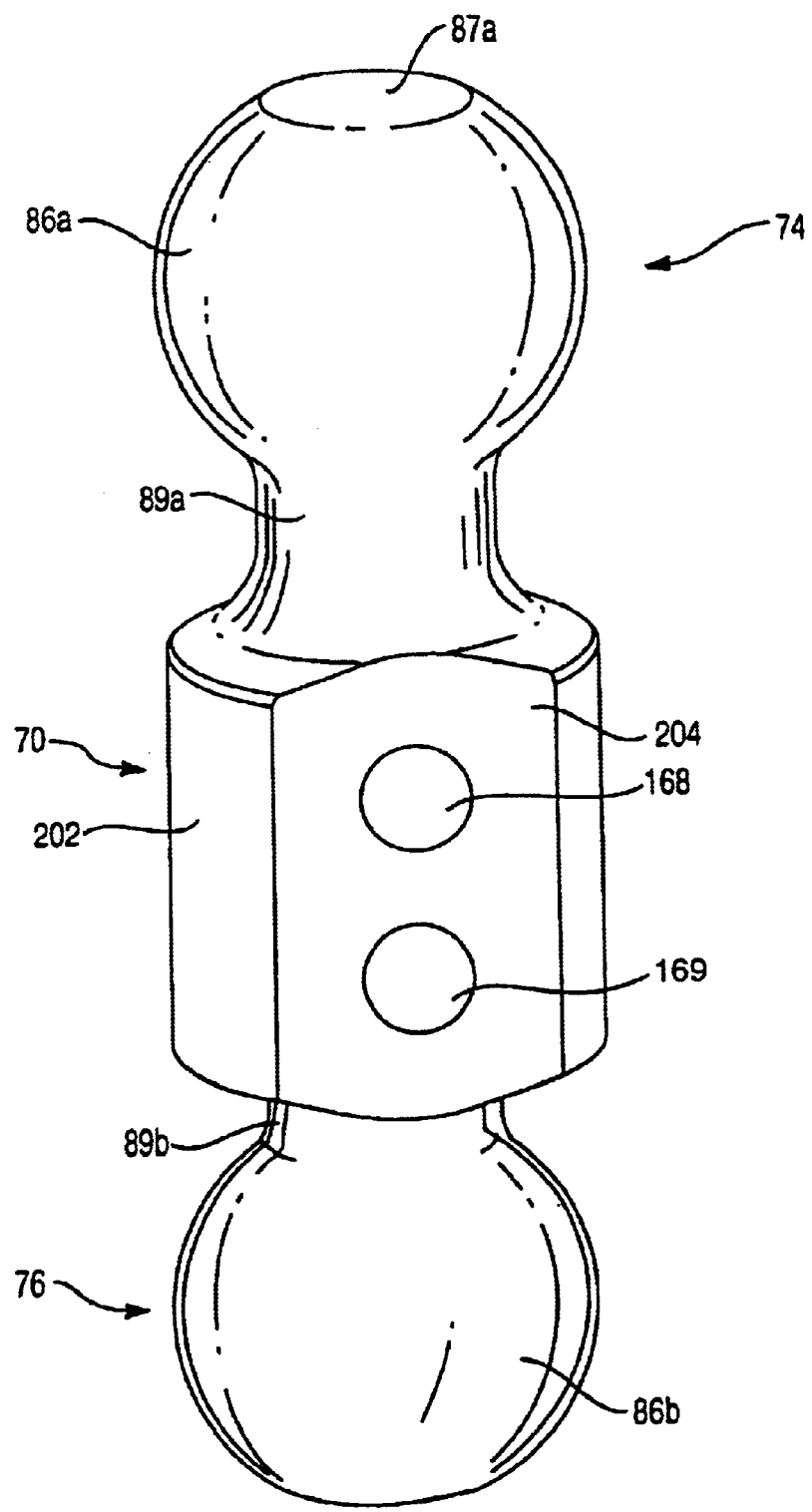
FIGS. 16A–16C are perspective views of embodiments of an integrated hitch and fastening portion in accordance with the invention.

Referring to FIG. 16A, the pivot 72 may be embodied as a guide 170 extending through the pivot aperture 168 in the base 202. A lock pin 126 may still be relied upon to extend through the locking aperture 169 to fix the position of the pedestal 94 with respect to the side beams 42a, 42b.

Figure 16B:
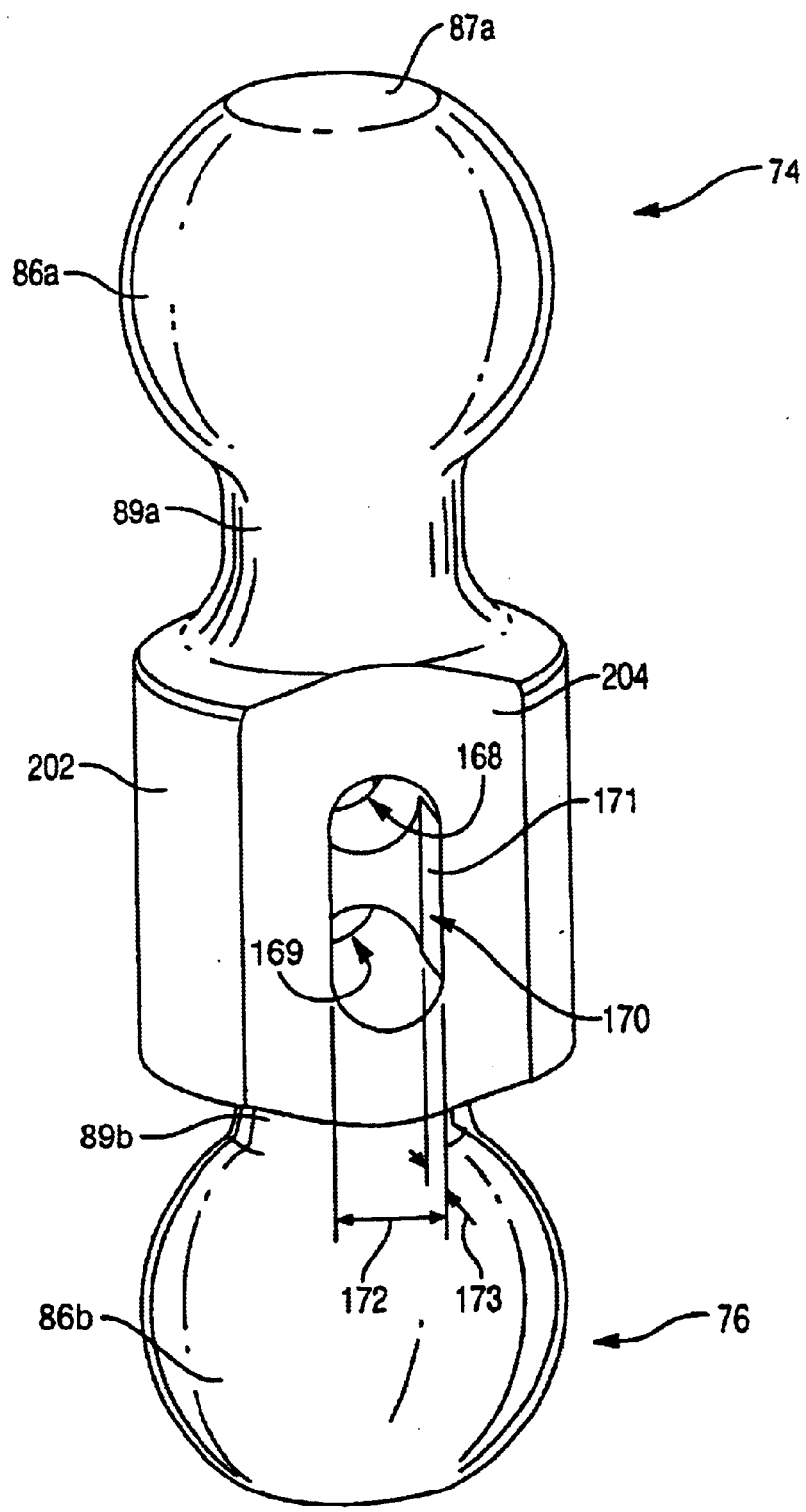
Figure 16C:
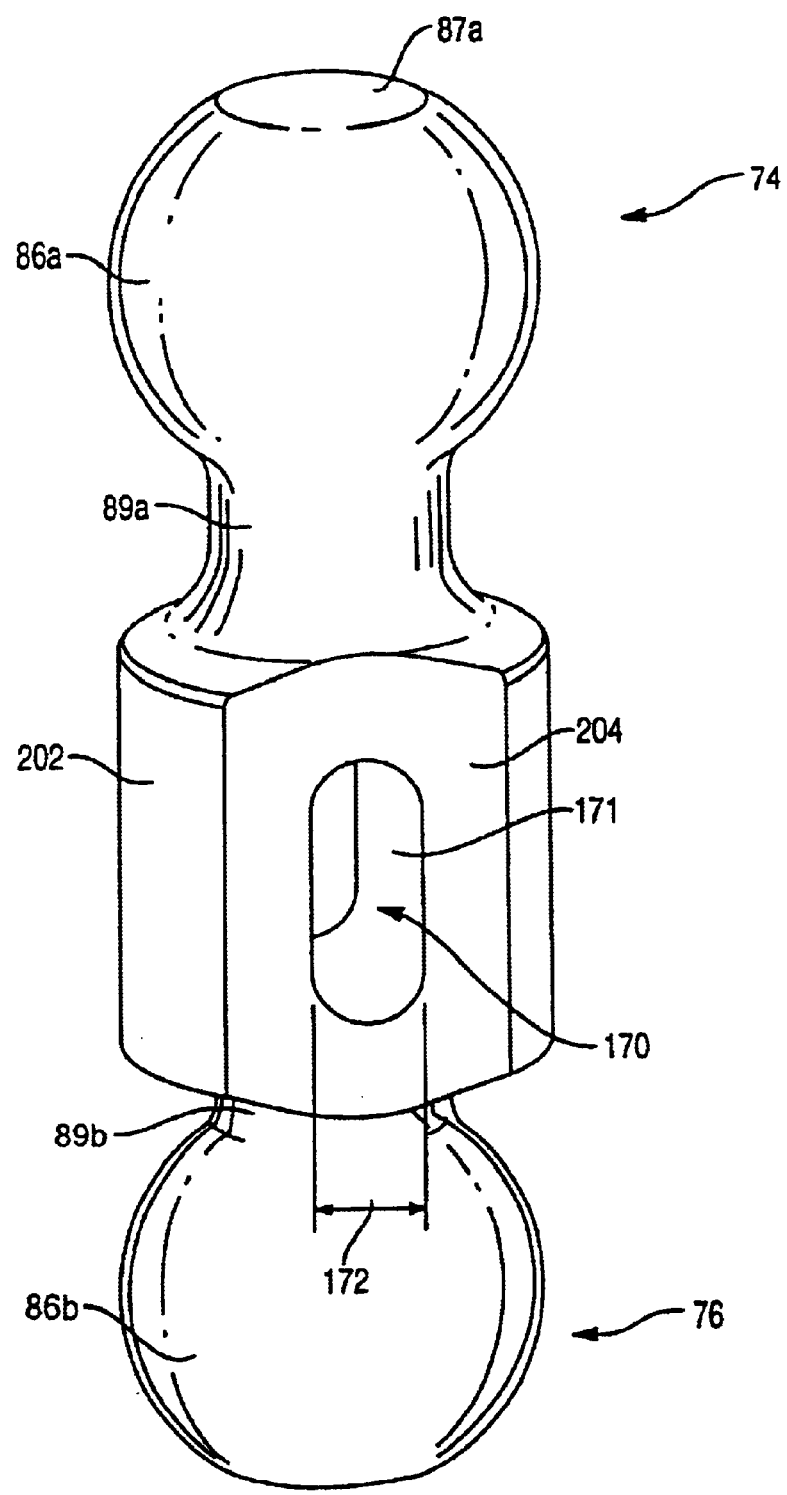

Referring to FIG. 16B, the fastening portion 70 and mount 40 may be secured by means of a guide 170, along which the pivot 72 may translate. In some embodiments, the guide 170 may be embodied as slots 171 formed on either side of the base 202. For the embodiment of FIG. 16C, the guide 170 may be embodied as a slot 171, which extends completely through the base 202.

Figure 17:
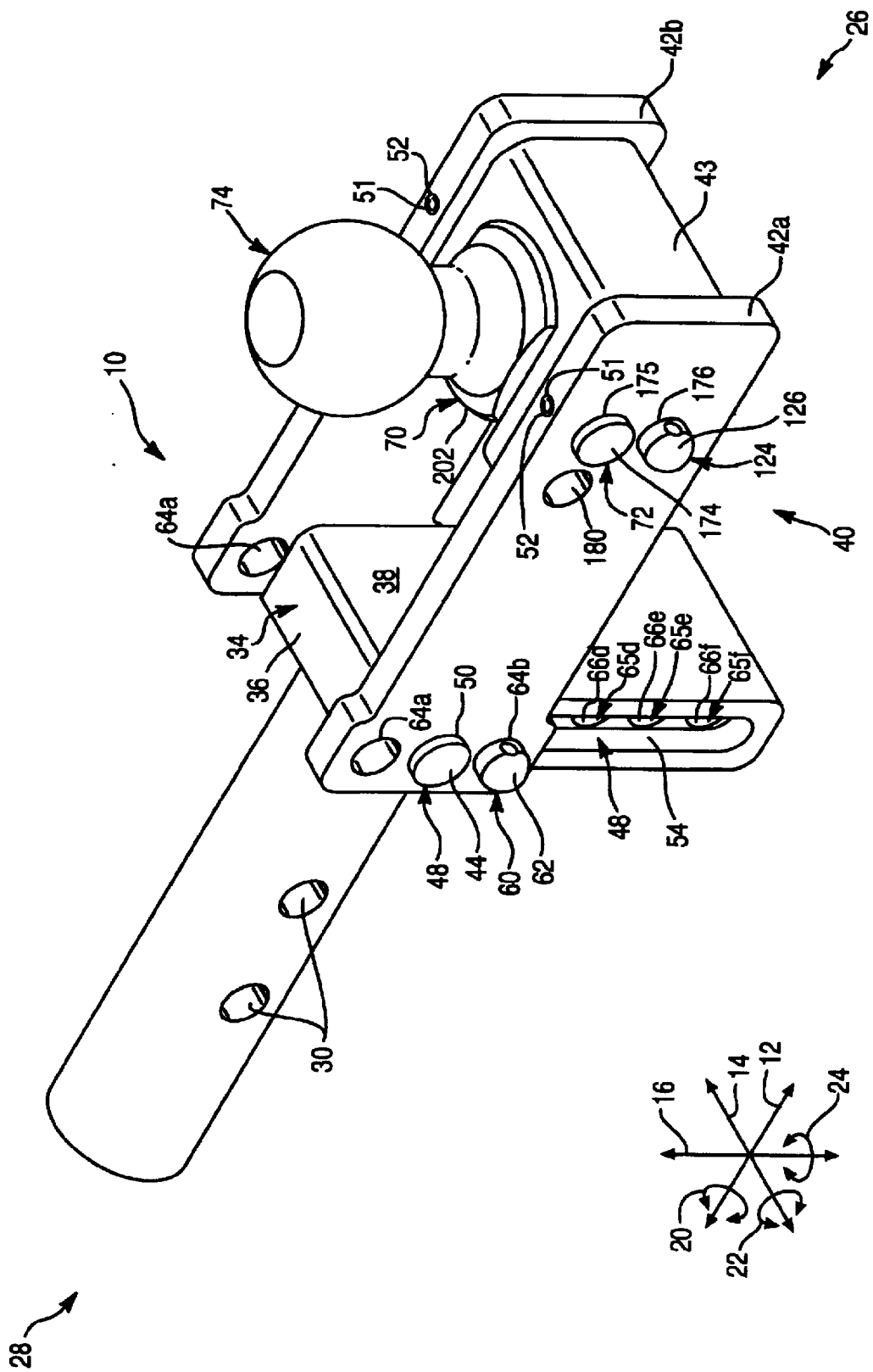
FIG. 17 is a perspective view of a hitch system having an integrated hitch and fastening portion in accordance with the invention.
Figure 18:
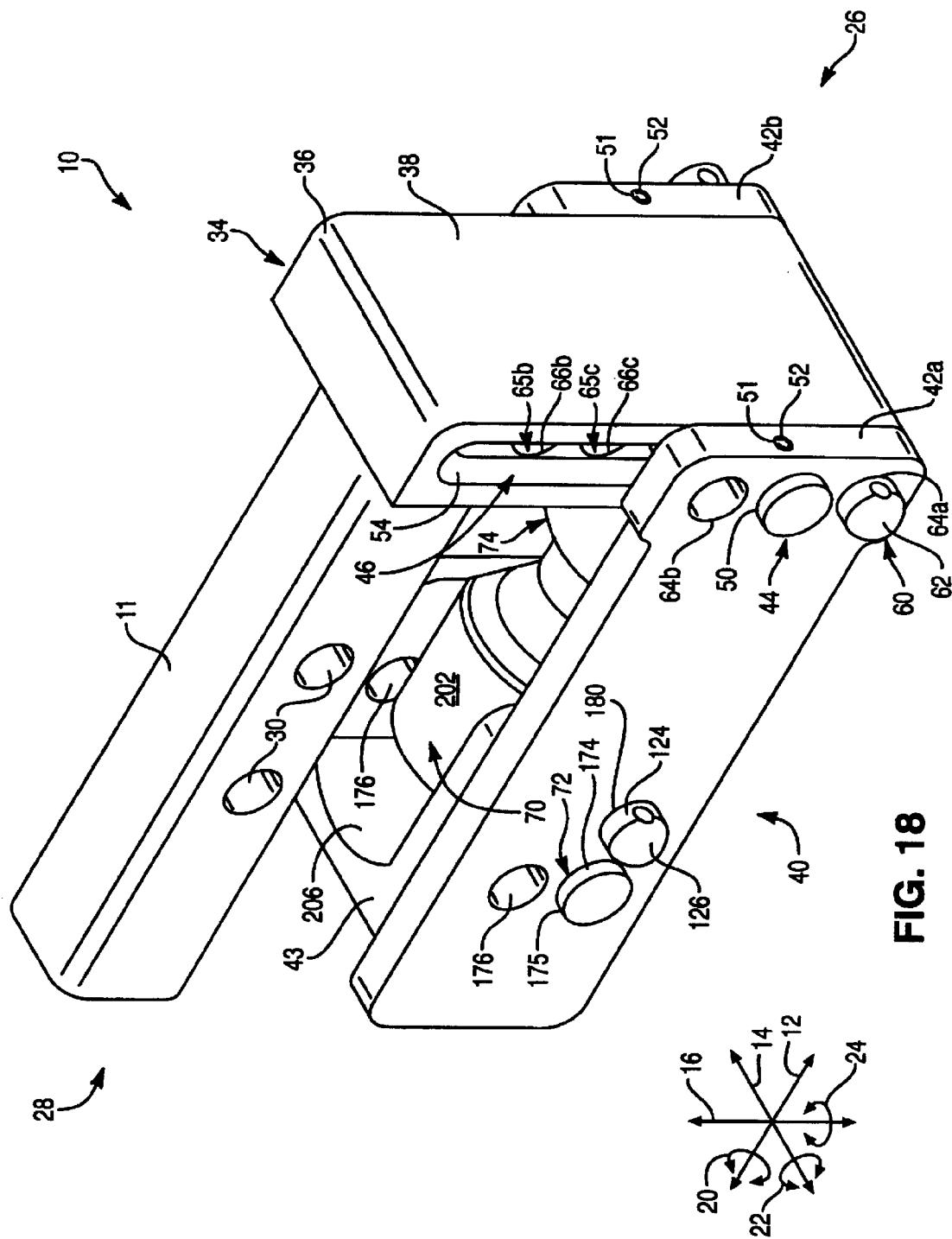
FIG. 18 is a perspective view of the apparatus of FIG. 17 in a stowed position in accordance with the invention.

Referring to FIGS. 17 and 18, a support 43 may be embodied as a platform having a notch 206 receiving the base 202. The apertures 175 and 176 may be spaced apart from one another in the transverse direction 16. Accordingly, the pivot and locking apertures 168, 169 are spaced apart from one another in the transverse direction 16 when the hitch 74, or hitches 74, 76, are in a deployed position, as in FIG. 17. For embodiments of the base 202 having a slot 171, or slots 171, a slot 171 typically extends in the transverse direction 16 when the base 202 is in a deployed position.

The apertures 175 and 180 may be spaced apart from one another in the longitudinal direction 12. Accordingly, the pivot and locking apertures 168, 169 are spaced apart from one another in the longitudinal direction 12 when the hitch 74, or hitches 74, 76, are in a stowed position as in FIG. 18. For embodiments of the base 202 having one or more slots 171, the slot 171, or the slots 171, typically extend in the longitudinal direction 12 when the base 202 is in a stowed position with respect to mount 40. This is true whether the mount 40 is in a stowed or deployed position with respect to the base 34, in the illustrated embodiments.

In some embodiments of an apparatus 10, the hitch 74 may pivot toward the base 34 and be oriented with the ball 86a proximate the base 34 when in a stowed position. Thus, the hitch extends from the pivot 72 toward the base 34. In this manner, a compact embodiment may be realized because the hitch 74 does not extend substantially beyond the side beams 42a, 42b.

A trunnion 11 may be formed with multiple locking apertures 30. Multiple locking apertures 30 may allow an apparatus 10 to be secured to receiver tubes having differently placed apertures. Thus, an apparatus 10 may be inserted into a variety of receiver tubes and locked therein without extending inconveniently or unsafely therefrom.

Figure 19:
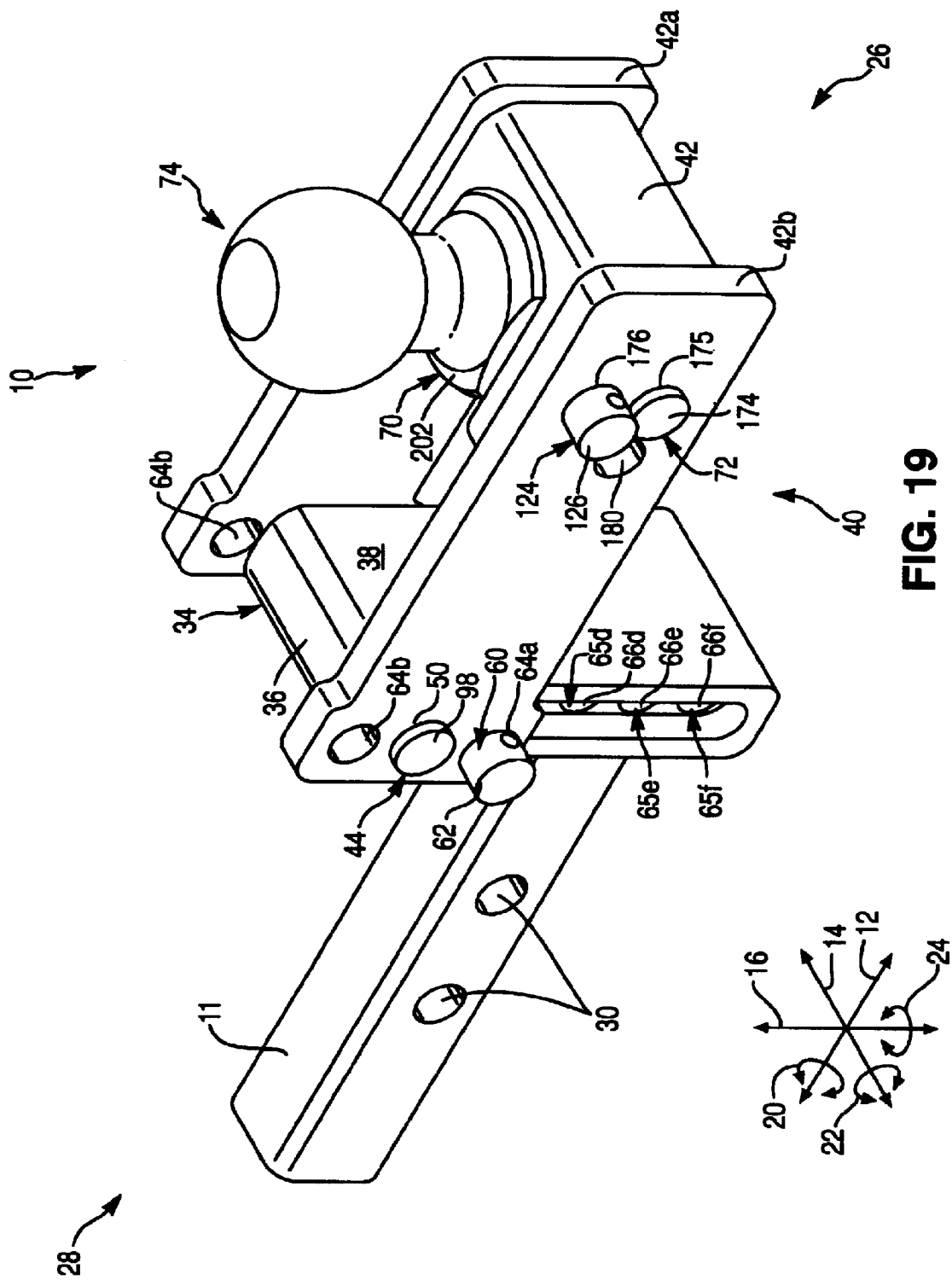
FIG. 19 is a perspective view of the apparatus of FIGS. 17 and 18 with an inverted mount and base in accordance with the invention.

Referring to FIG. 19, the mobility provided by the combination of a guide 170 and pivot 72 may provide for extension of the height adjustability provided by the height adjustment locators 65a–65f. For example, the apparatus 10 oriented as in FIGS. 17 and 18 provides a range of heights extending nominally downward, in the transverse direction 16, from the trunnion 11.

The apparatus 10 may be inverted, as in FIG. 19, to provide a range of heights extending upward along a transverse axis 16 from the trunnion 11. By rotating the fastening portion 70 about the pivot 72 and translating it along the guide 170, the hitches 74, 76, can be oriented suitably for towing a vehicle, regardless of the orientation of the base 34 and mount 40. This versatility can be conveniently realized by securing the base 34 to a round trunnion 11, enabling a user to rotate the apparatus 10 about an axis in the longitudinal direction 12 without removing the trunnion 11 from the receiver cavity.

Figure 20:
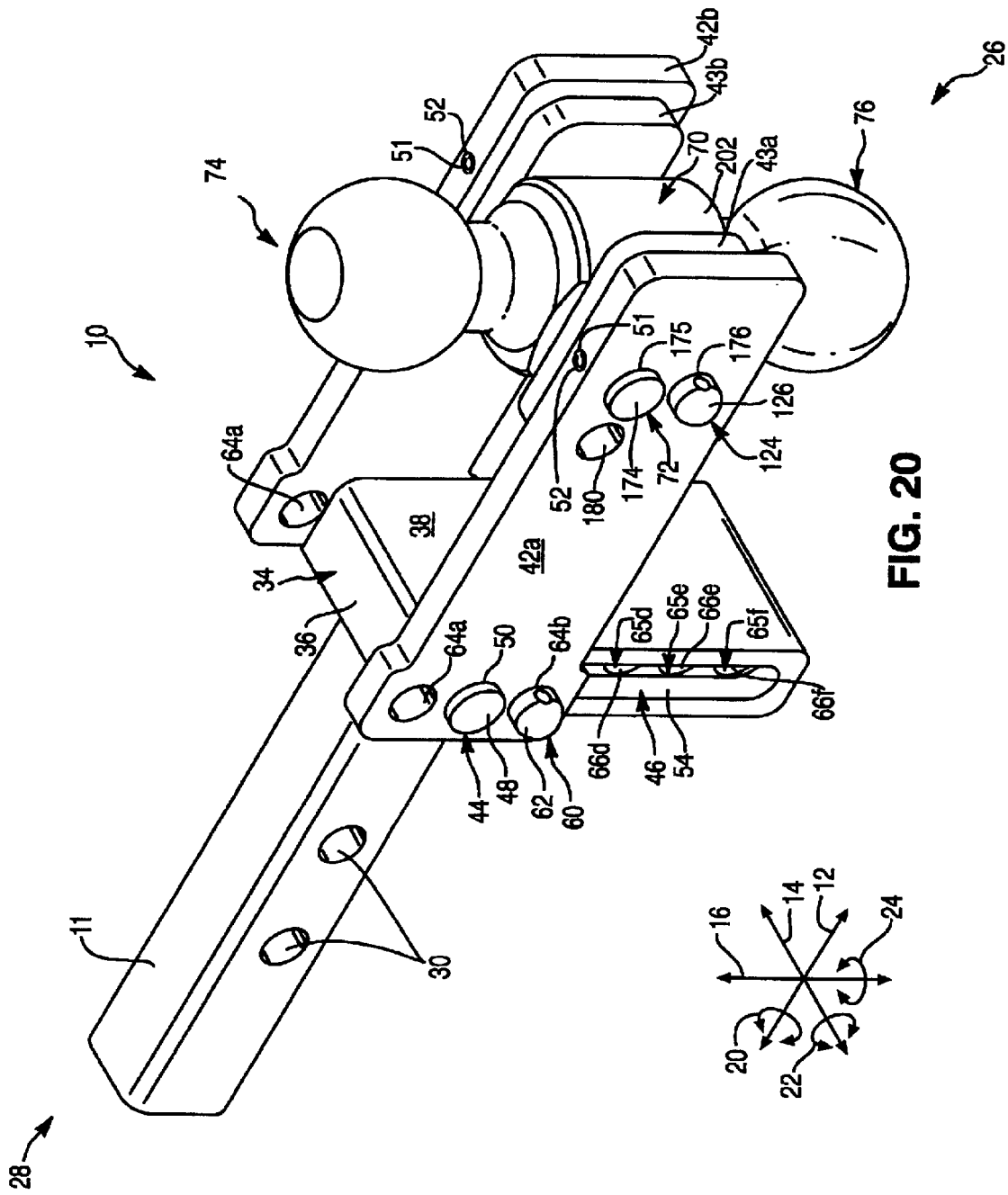
FIG. 20 is a perspective view of the apparatus of FIGS. 17–19 having multiple hitches.

Referring to FIG. 20, some embodiments of the support 43 may provide for the use of additional hitches 76 by not interfering with the rotation of the hitches 74, 76 about the pivot 72. For example, in some embodiments of the apparatus 10, the support 43 may be embodied as spacers 43a, 43b positioned on either side of the fastening portion 70.

Figure 21:
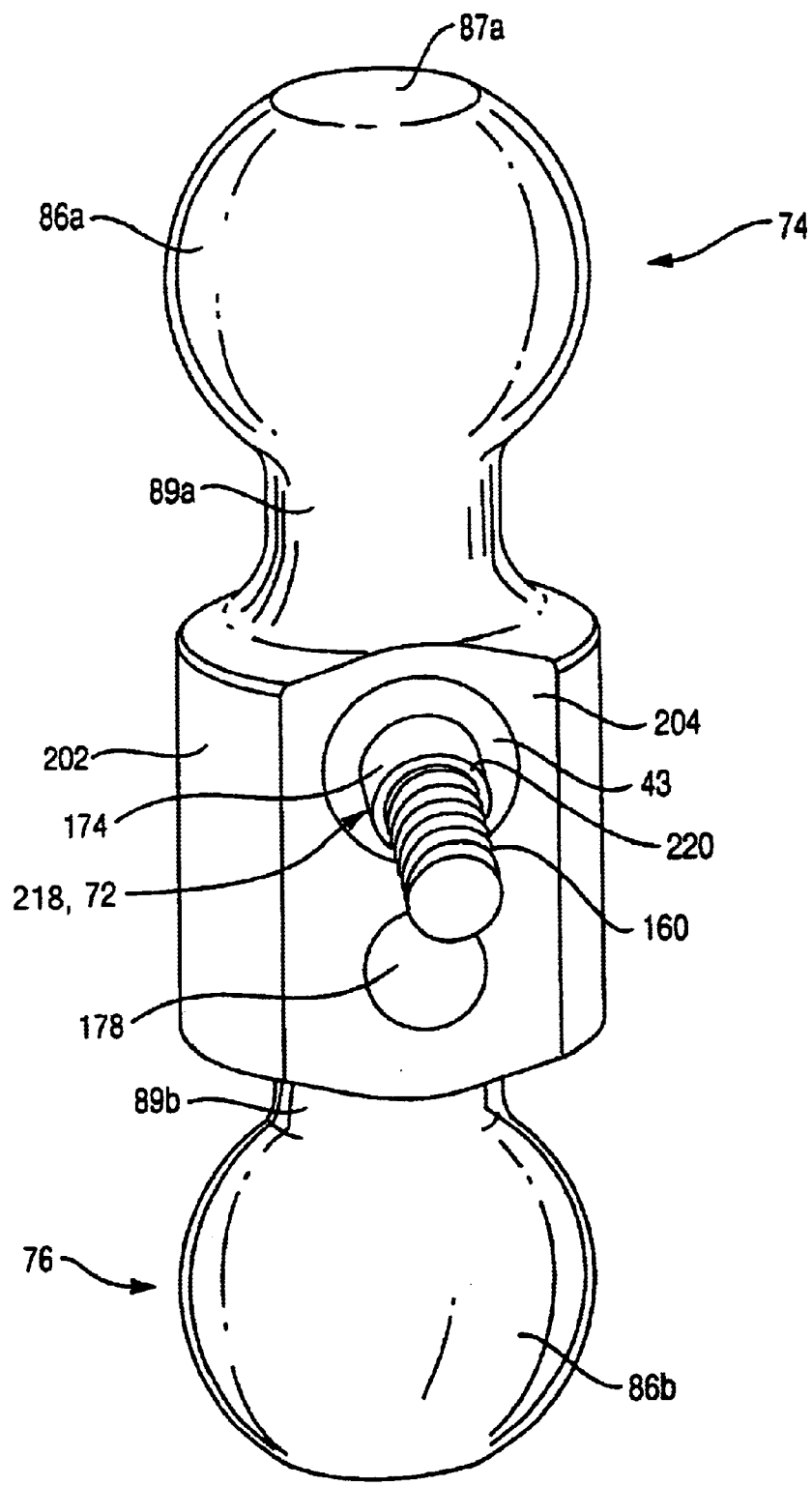
FIG. 21 is a perspective view of a fastening portion having multiple integral hitches and a tie rod suitable for use in accordance with the invention.

Referring to FIG. 21, in some embodiments of an apparatus 10, the pivot 72 may be embodied as a tie rod 218. The tie rod 218 may have threaded portions 160 formed on either end. The spacers 43a, 43b may be embodied as washers or other suitable spacers 43a, 43b capable of maintaining a separation between the side beams 42a, 42b and the fastening portion 70. For example, the spacers 43a, 43b may be embodied as extensions formed in the side beams 42a, 42b. In some embodiments, the side beams 42a, 42b may be spaced such that the fastening portion 70 contacts the side beams 42a, 42b directly and, thus, spacers 43a, 43b are not needed. The tie rod 218 may also have a shoulder 220 on either end. The shoulder 220 may serve to maintain the side beams 42a, 42b apart and alleviate pressure on the fastening portion 70 from inhibiting its motion.

Figure 22:
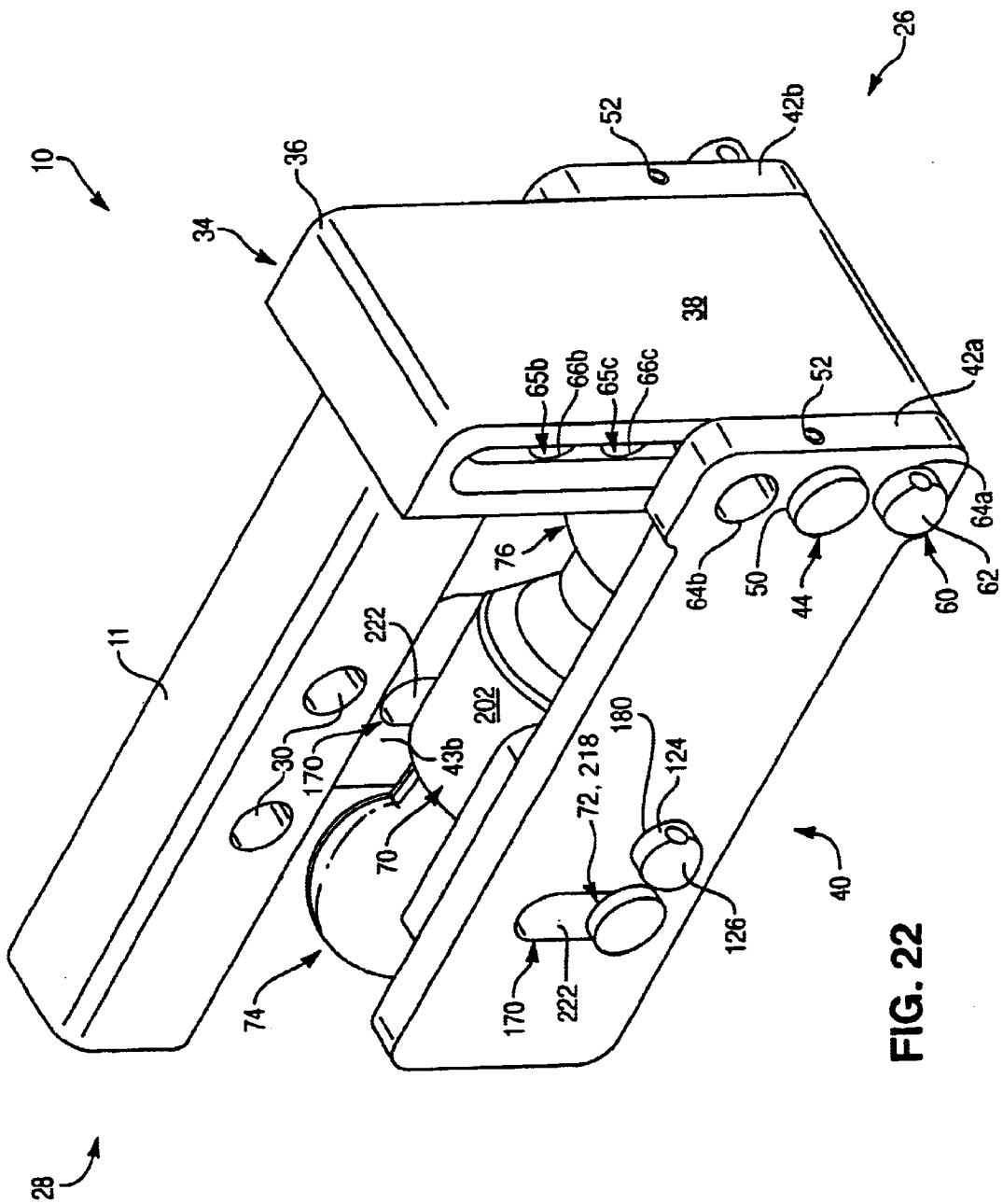
FIG. 22 is a perspective view of a hitch system having a fastening portion and tie rod as depicted in FIG. 21.

Referring to FIG. 22, in some embodiments, the guide 170 may be formed as slots 222 in the side beams 42a, 42b. The tie rod 218 may extend through the slots 222 and be translatable therealong. The tie rod 218 may also rotate within the slots 222. A nut (not shown) or other fastener may attach to the ends of the tie rod 218 and prevent removal of the tie rod 218.

The locking pin 126 may be inserted through the aperture 180 in the side beam 42a, through the locking aperture 169 in the fastening portion 70, and through the aperture 180 in the side beam 42b to lock the fastening portion 70 in a stowed position. The locking pin 126 may be inserted through the slot 170 in the side beam 42a, through the locking aperture 169, and through the guide 170 in the side beam 42b in order to lock either the hitch 74 or the hitch 76 in a developed position, depending on the orientation of the fastening portion 70 when the pin 126 is inserted. The fastening positon 70 and tie rod 218 may be translated upward in a transverse direction 16 and rotated about an axis in the lateral direction 14, as necessary, to orient the hitch 74 suitable for towing a vehicle. The fastening portion 70 and tie rod 218 may be translated downward in a transverse direction 16 and rotated about an axis in the lateral direction 14, as necessary, to orient the hitch 76 suitable for towing a vehicle.

Figure 23:
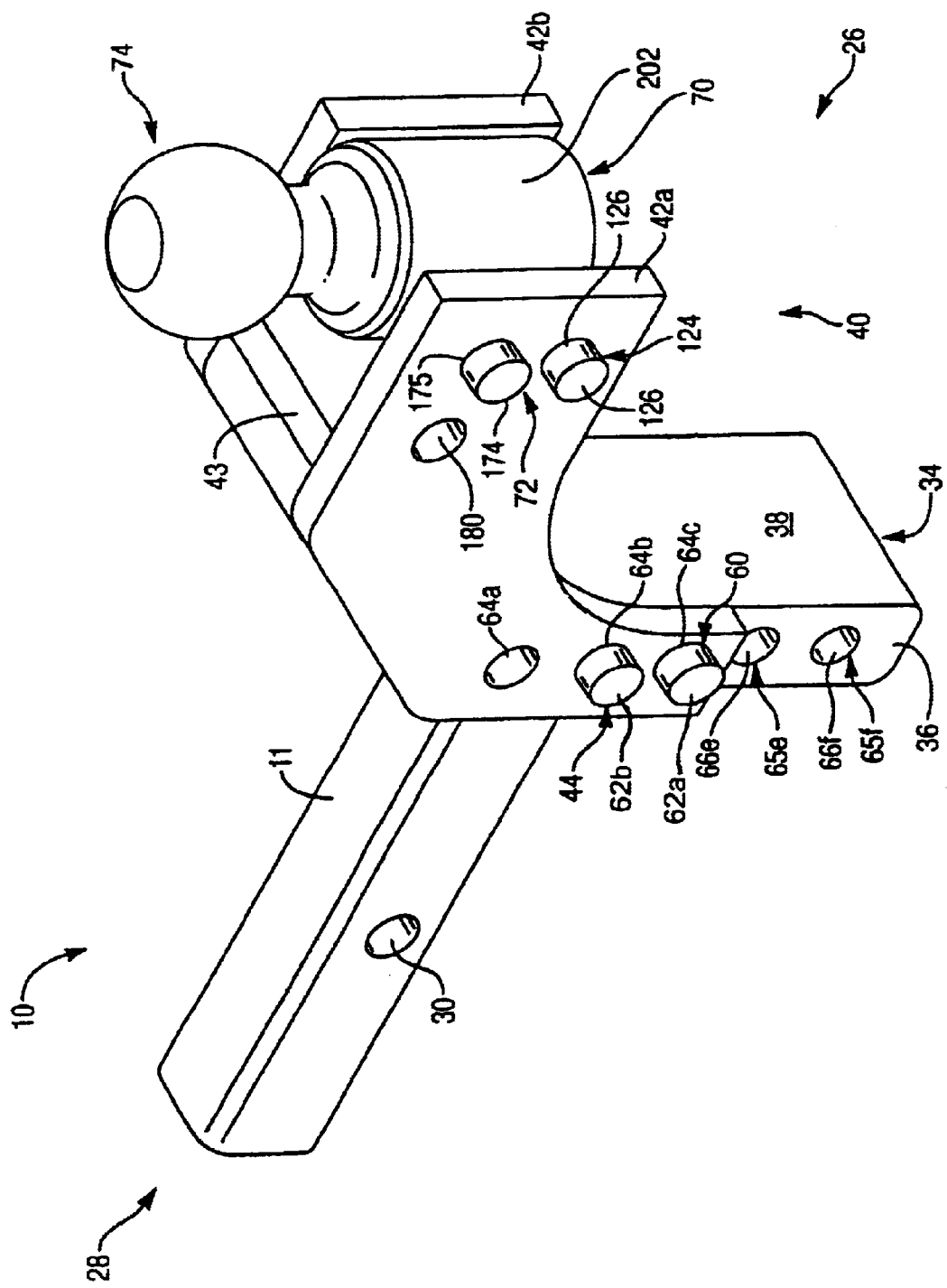
FIG. 23 is a perspective view of an alternative embodiment of a hitch system in accordance with the invention.

Referring to FIG. 23, a base 34 may be formed without a guide 46. Translation along the base may then be accomplished by removing any locking pins 62, thereby completely releasing the mount 40 from the base 34. The mount 40 may be positioned adjacent a height adjustment locator 65a–65f and the lock 60 engaged, thereby providing height adjustability. The pivot 44 may be embodied as a locking pin 62a which may be left engaged with the side beams 42a, 42b and the block 36. With a single locking pin 62a engaged, the mount 40 may be pivoted thereabout into a deployed or stowed position. A second locking pin 62b may then be inserted through an aperture 50, 64a–64c in the side beams 42a, 42b and through an aperture 66a–66f in order to substantially fix the position and orientation of the mount 40 relative to the base 34.

Figure 24:
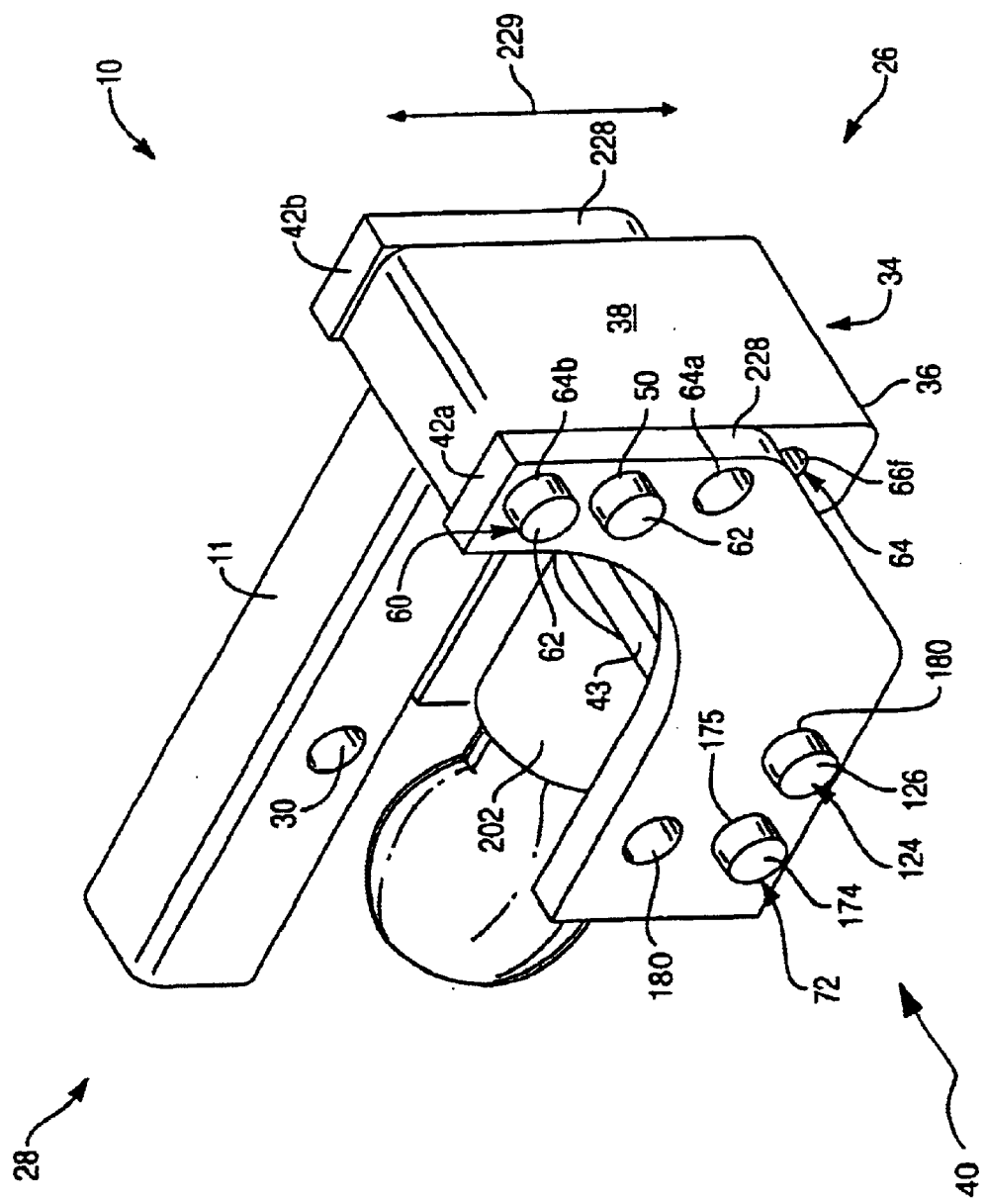
FIG. 24 is a perspective view of the apparatus of FIG. 23 in a stowed position in accordance with the invention.

Referring to FIG. 24, the side beams 42a, 42b may have surfaces 228 which may extend along a length 229 of the base 34 when the mount 40 is in a stowed position. The length 229 may be mostly the dimension of the base 34 in a transverse direction 16. For example, for a base 34 embodied as a block 36, the surfaces 228 may extend along a substantial portion of the length of the block 36, as shown in FIG. 24. This provides for a more uniform appearance of the base and visible surfaces 228 when the mount 40 is in a slowed position. In some embodiments of an apparatus 10, the support 43 may be embodied as a cross beam maintaining the side beams 42a, 42b separated by a fixed distance.

Figure 25:
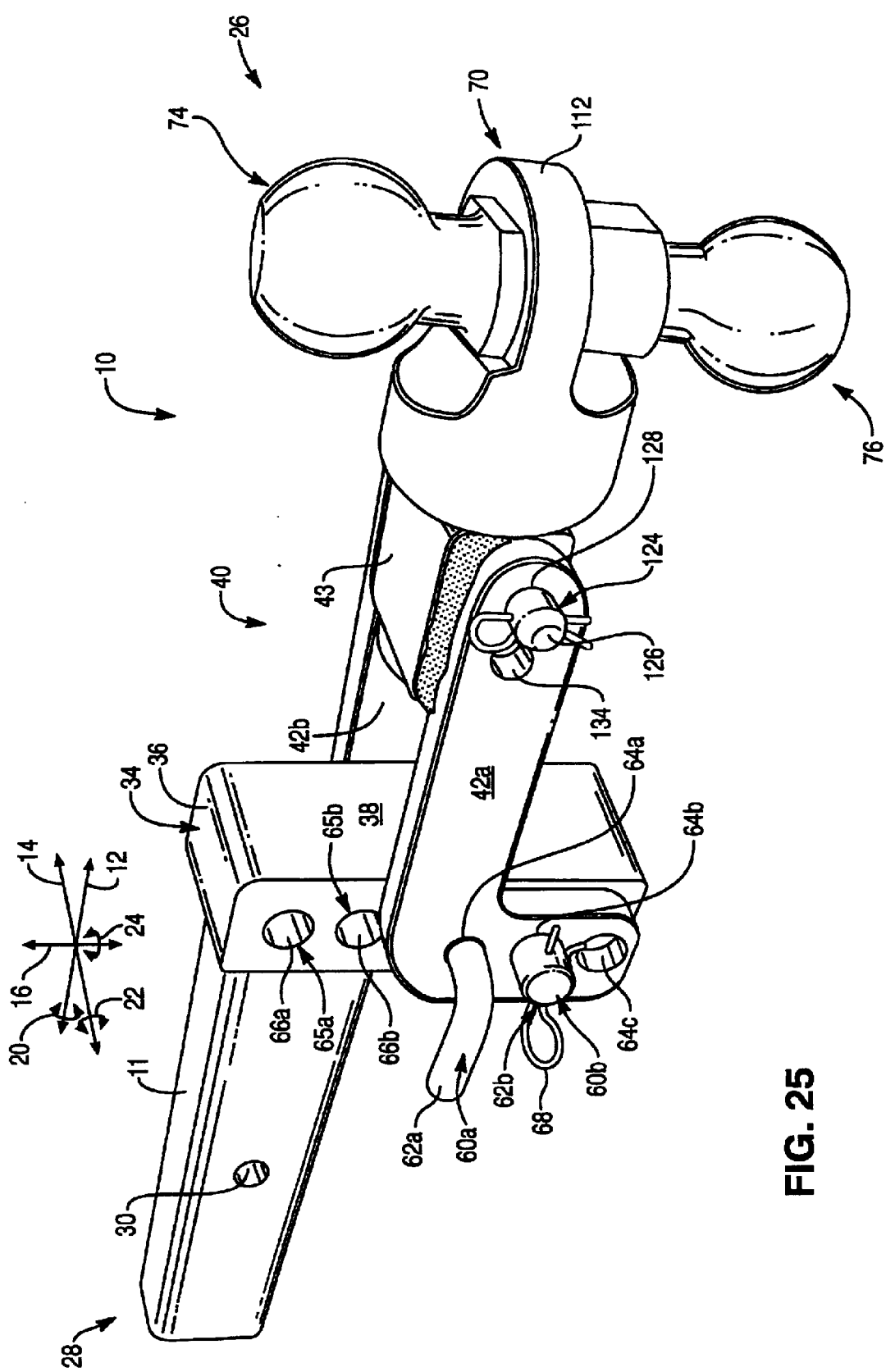
FIG. 25 is a perspective view of an alternative embodiment of a hitch system in accordance with the invention.

Referring to FIG. 25, various combinations of the illustrative embodiments of bases 34, mounts 40, fastening portions 70, and hitches 74, 76 disclosed herein are possible. For example, the block 36 of FIGS. 23 and 24 may be combined with the turntable 112 of FIGS. 1–9 to give an apparatus 10 as illustrated in FIG. 25.

Figure 26:
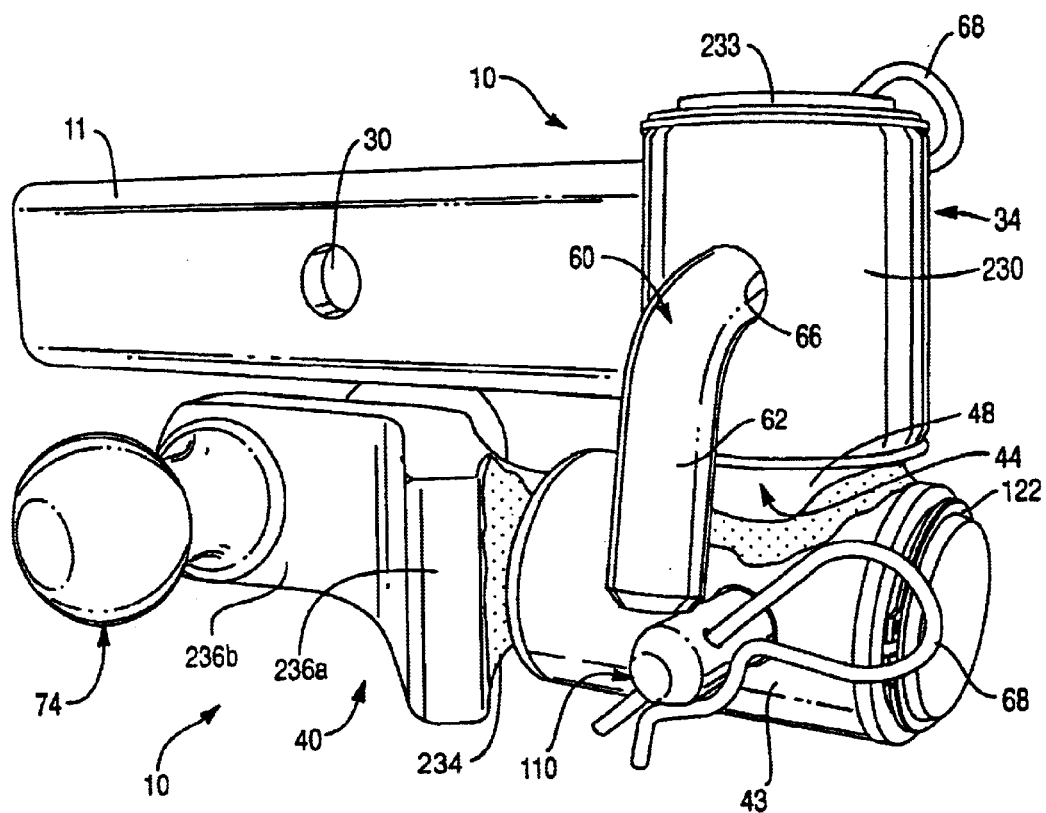
FIG. 26 is a perspective view of an alternative embodiment of a hitch system in a stowed position in accordance with the invention.
Figure 27:
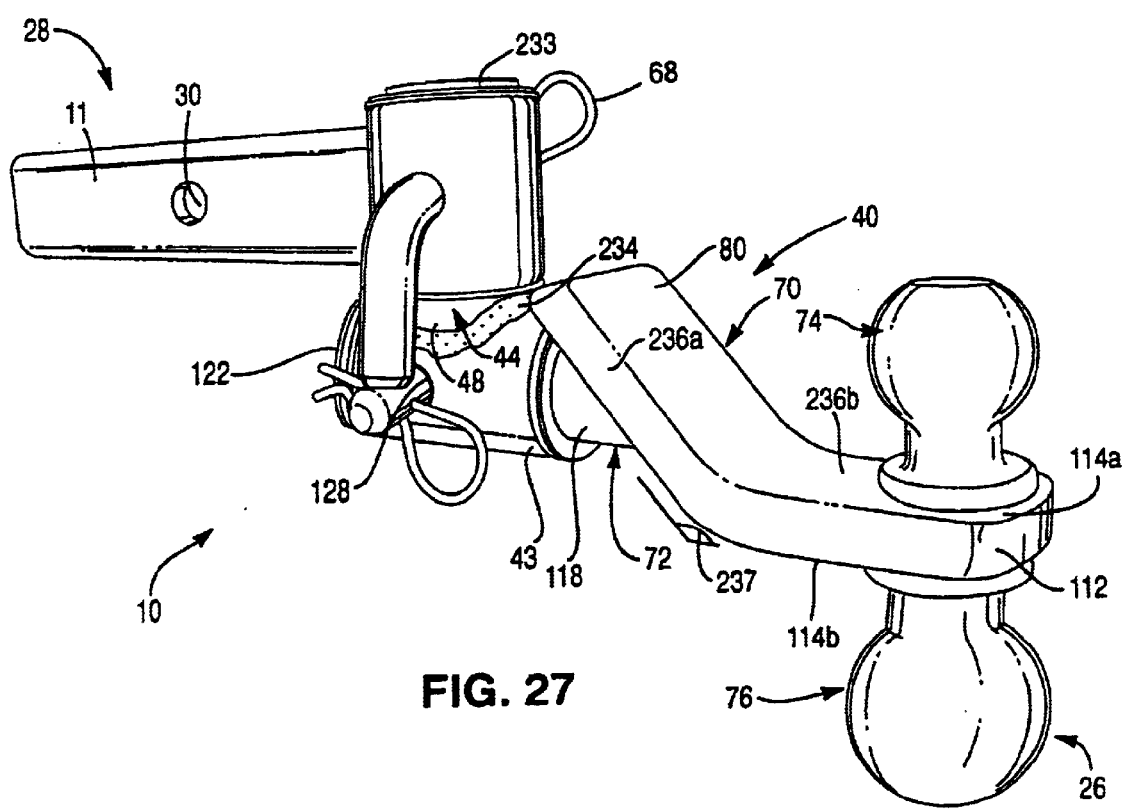
FIG. 27 is a perspective view of the apparatus of FIG. 26 in a deployed position.
Figure 28:
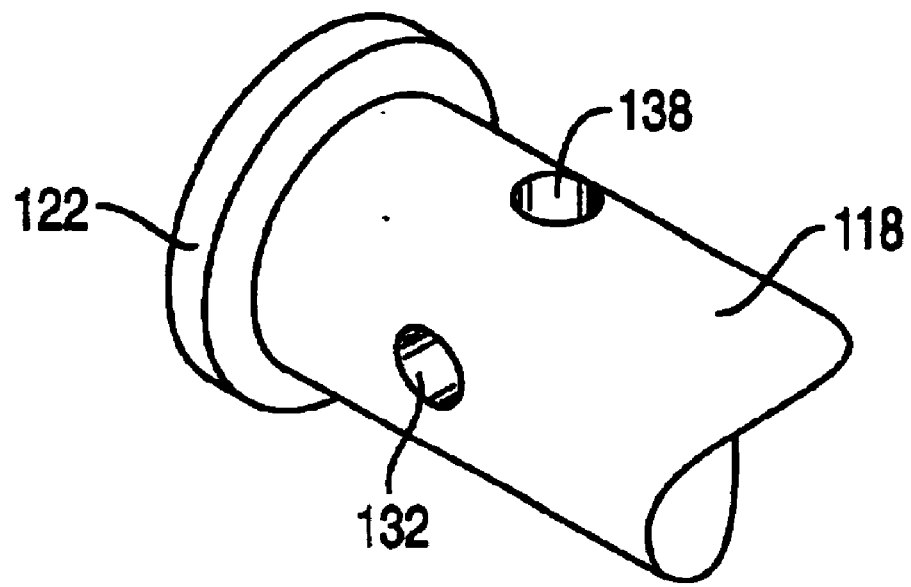
FIG. 28 is a partially cutaway, perspective view of a pivot suitable for use as a pivot in accordance with the invention.

Referring to FIGS. 26–28, a base 34 may be embodied as a cylinder 230. The cylinder 230 may be secured to a trunnion 11. The pivot 44 may be embodied as a stud 48 extending through the cylinder 230. The stud 48 may be held in place by a retainer 233 such as a snap ring, threaded cap, or the like having a diameter larger than that of the interior of the cylinder 230. The retainer 233 may be fashioned to support loads in a transverse direction 16.

A locking pin 62 may still be relied upon to fix the position of the mount 40 relative to the base 34. In some embodiments, transverse loads may be supported primarily by the pin 62 inserted through the aperture 66 in the cylinder 230 and through a locking aperture 64 formed in the stud 48. The extension of a locking pin 62 through the aperture 66 in the cylinder 230 and through an aperture 64 in the stud 48 may lock the mount 40 in either a deployed or stowed position.

In some embodiments of an apparatus 10, the support 43 may be embodied as a cylinder. The cylinder may be secured to the stud 48 by a weld 234 or other suitable fastening means. The turntable 112 may be embodied as two arms 236a, 236b oriented at an angle 237 from one another. One arm 236a may be secured to the shaft 118 of the pivot 72. The other arm 236b may serve as a location for securement for a hitch 74, or hitches 74, 76.

Referring to FIG. 28, while referring generally to FIGS. 26 and 27, apertures 132, 138 formed in the shaft 118 may be distributed along a common plane such that a single aperture 130 may be used to lock the turntable 112 in stowed and locked positions. By aligning the aperture 130 with the aperture 138, the mount 40 may be locked in stowed positions as in FIG. 26. By aligning the aperture 130 with the aperture 132 the turntable 112 may be locked in deployed positions as in FIG. 27.

Figure 29:
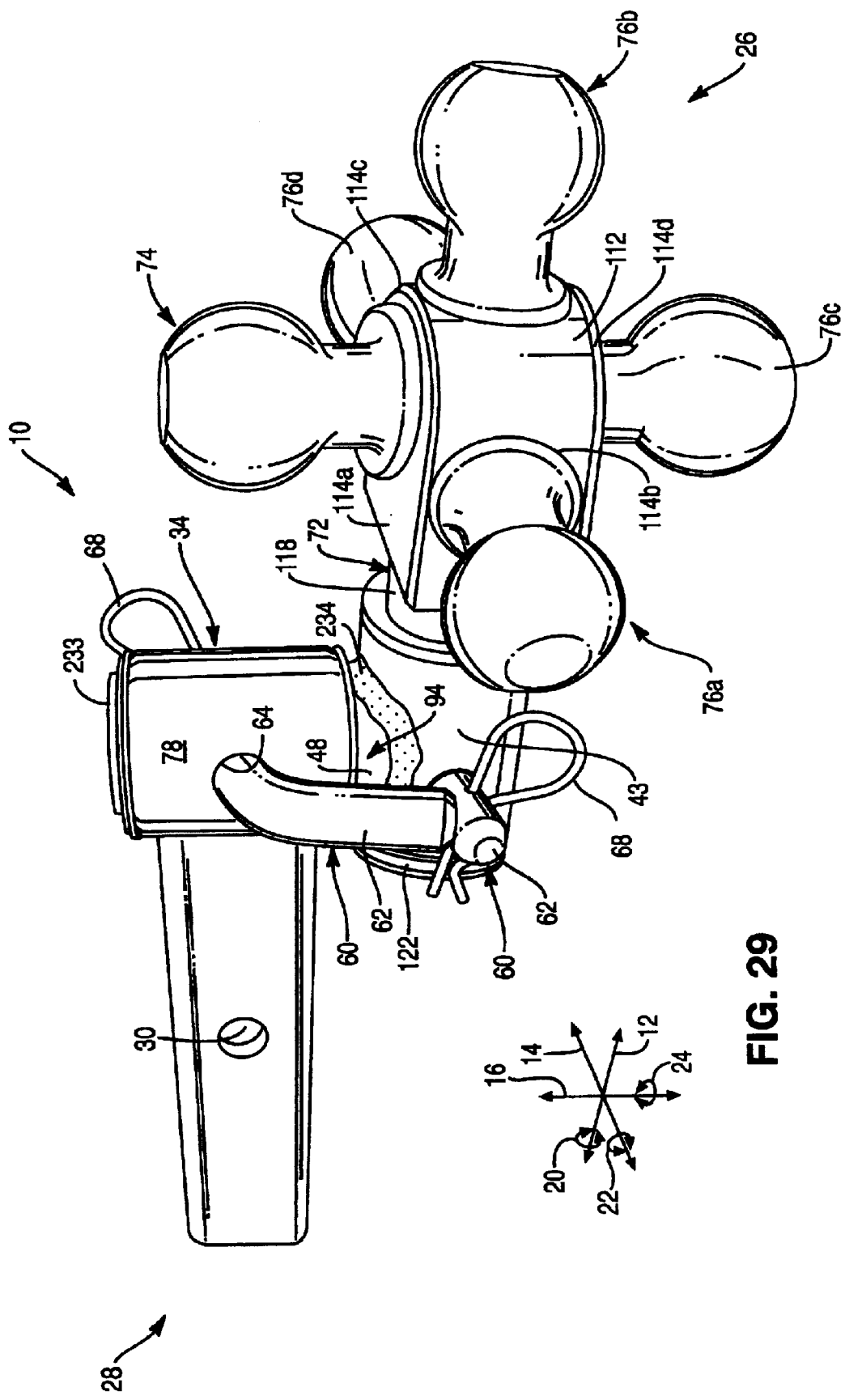
FIG. 29 is a perspective view of an alternative embodiment of a hitch system in accordance with the invention.

Referring to FIG. 29, a turntable 112 may bave any suitable number of surfaces 114a, 14b receiving any suitable number of hitches 74, 76. For example, a turntable may have four surfaces 114a–114d formed thereon to receive hitches 74, 76a–76d. In some embodiments, the turntable 112 may have only three hitches 74, 76a, 76b mounted thereon. This may enable the turntable 112 to be positionable suitable for stowage without a hitch 74, 76a–76d interfering with the trunnion 11.

A locking pin 126 may be insened through the aperture 128 in the support 43 and through the aperture 132 in the shaft 118 in order to lock either the hitch 74 or hitch 76b in an orientation suitable for towing a vehicle. A locking pin 126 may be inserted through the aperture 128 in the support 43 and through the aperture 138 in the shaft 118 in order to lock either hitch 76a or hitch 76c in an orientation suitable for towing a vehicle.

Figure 30:
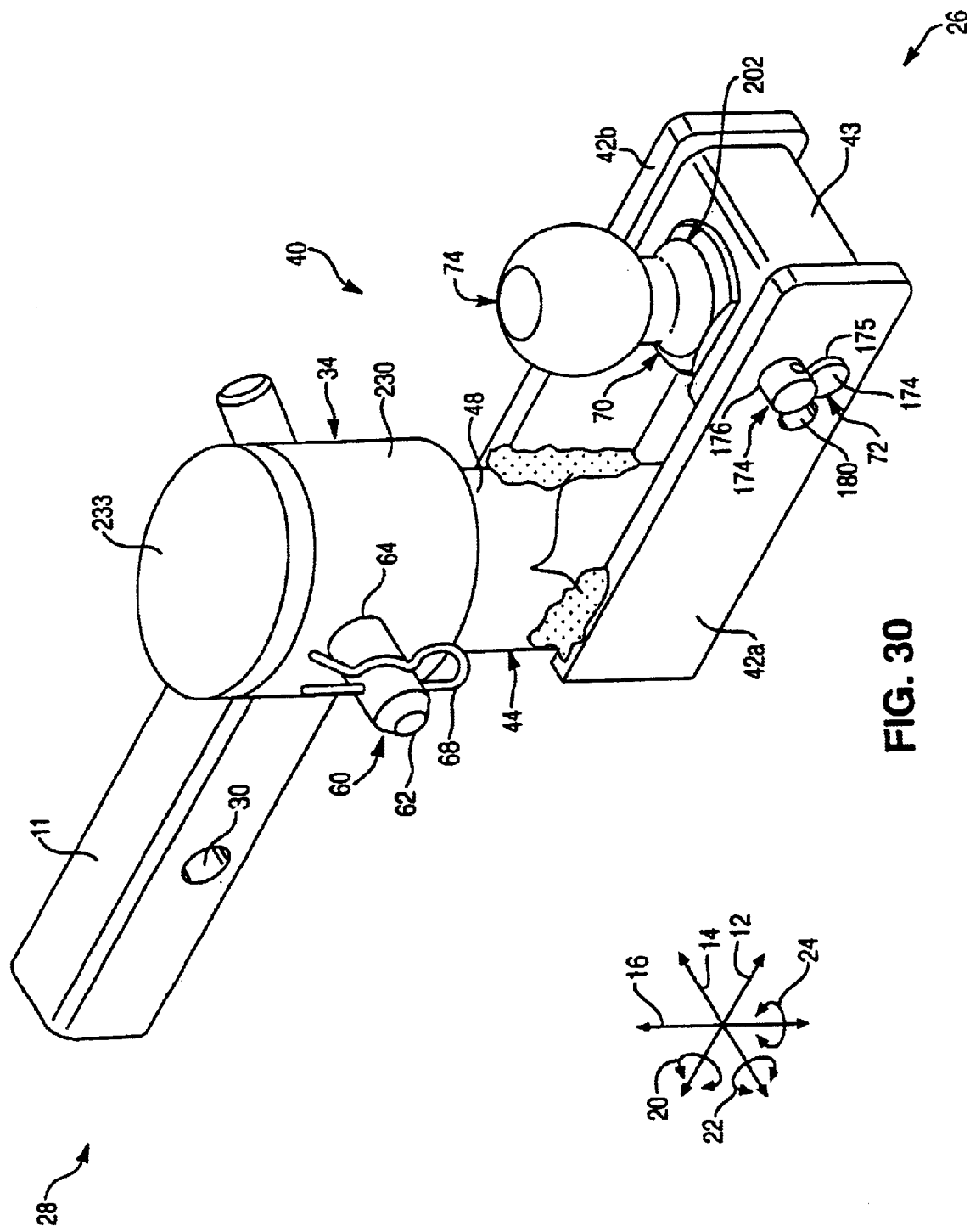
FIG. 30 is a perspective view of an alternative embodiment of a hitch system in accordance with the invention.

Referring to FIG. 30, all reasonable combinations of the illustrative embodiments of bases 34, mounts 40, fastening portions 70, and hitches 74, 76 disclosed herein are contemplated within the scope of the instant invention. For example, the cylindrical base of FIGS. 26–29 may be combined with the fastening portion and integrated hitch 74 and fastening portion 70 of Figures 16A–20.

Figure 31:
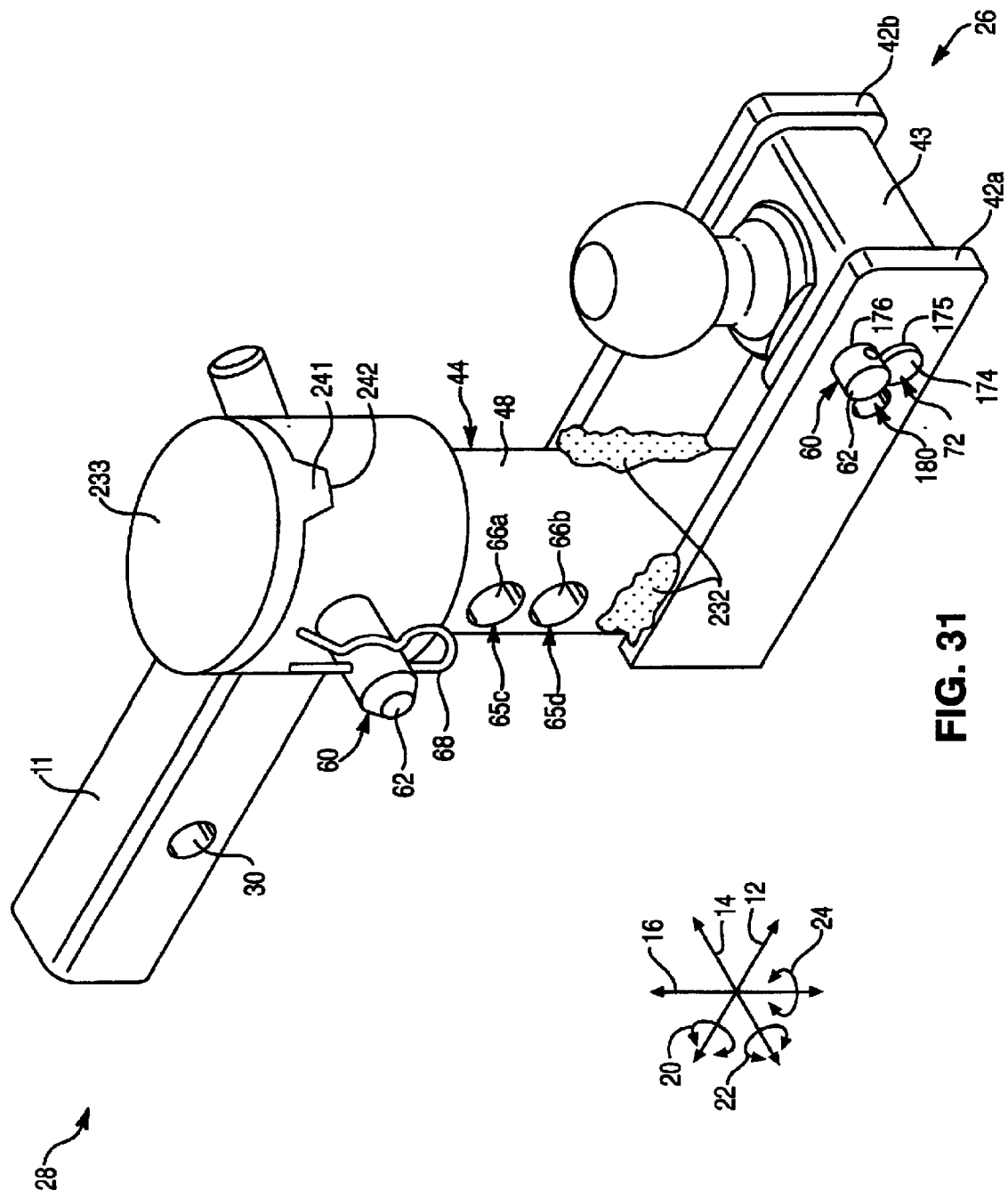
FIG. 31 is a perspective view of an alternative embodiment of a hitch system in accordance with the invention.

Referring to FIG. 31, a stud 48 may have any suitable number of height adjustment locators 65a–65d formed therein. The height adjustment locators 65a–65d may be embodied as any suitable number of grooves or apertures 66a–66c or any suitable formations operable for engaging a locking pin 62. The retainer 233 may have a registration tab 241 formed therein, which may engage a registration surface 242 such as a notch.

Figure 32:
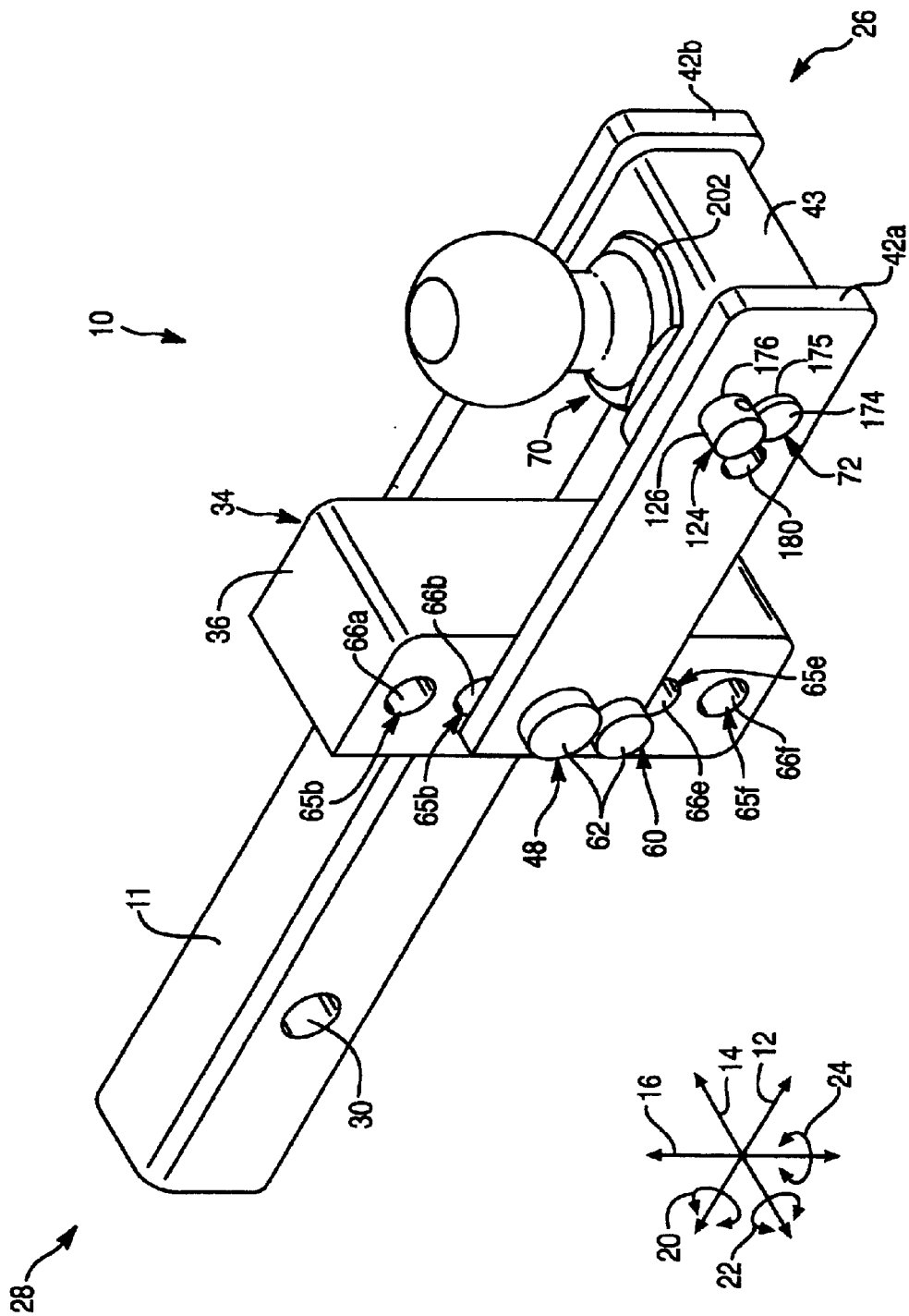
FIG. 32 is a perspective view of an alternative embodiment of a hitch system in accordance with the invention.

Referring to FIG. 32, in some embodiments an apparatus 10 may not have height adjustability. For example, the block 36 may have a single deployment aperture 66a and a single stowage aperture 66c. The side beams 42a, 42b may have a single locking aperture 64. The pivot stud 48 may engage an aperture 66b in the block 36 such that the mount 40 is limited to rotation about an axis in the lateral direction 14. A pin 62 may be inserted into the aperture 64 in the side beam 42a, through the aperture 66a, and through an aperture 64 in the side beam 42b in order to lock the mount 40 in a stowed position. A pin 62 may be inserted through the aperture 64 in the side beam 42a, through the aperture 66b, and through the aperture 64 in the side beam 42b in order to lock the mount 40 in a stowed position.

Figure 33:
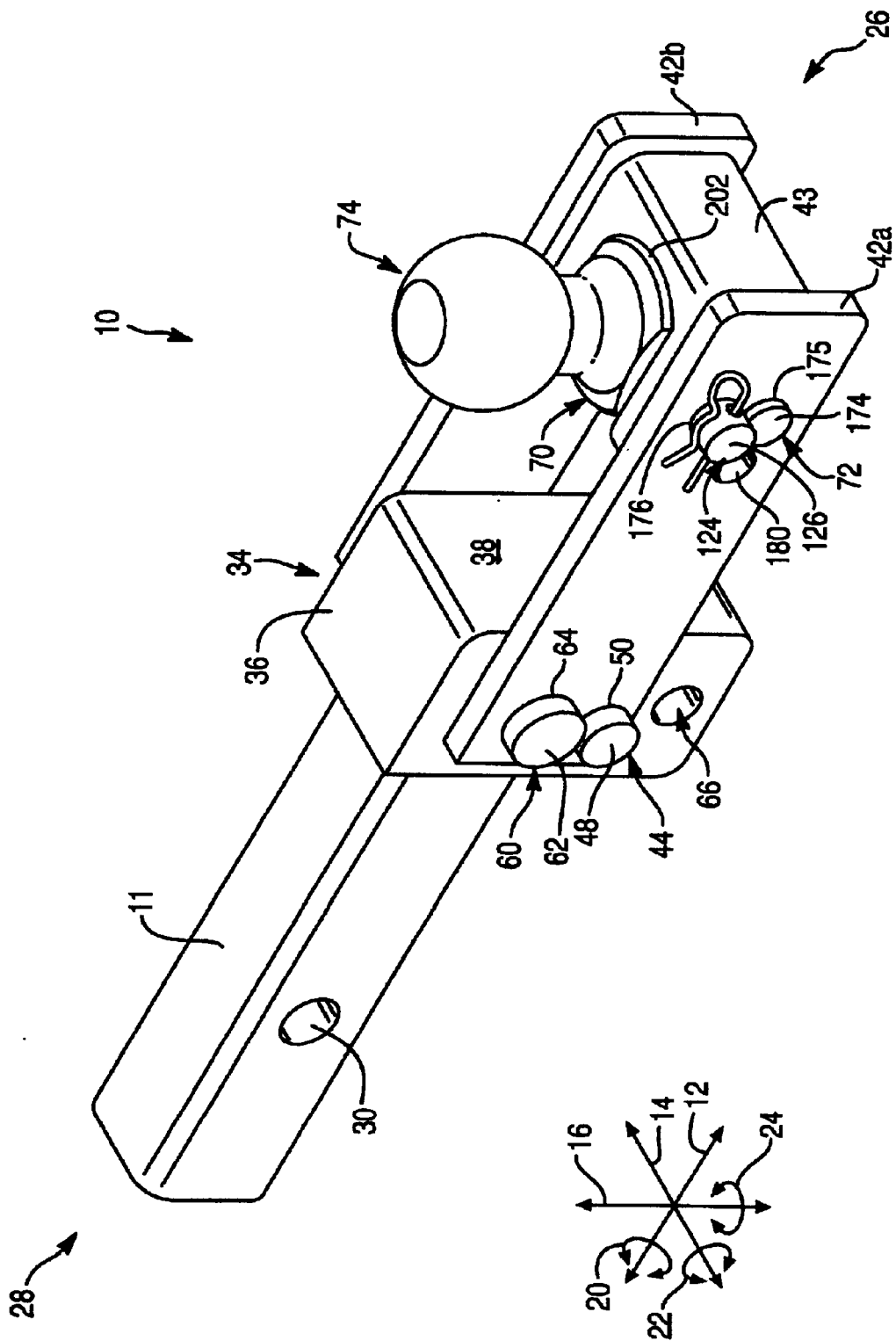
FIG. 33 is a perspective view of an alternative embodiment of a hitch system in accordance with the invention.
Figure 34:
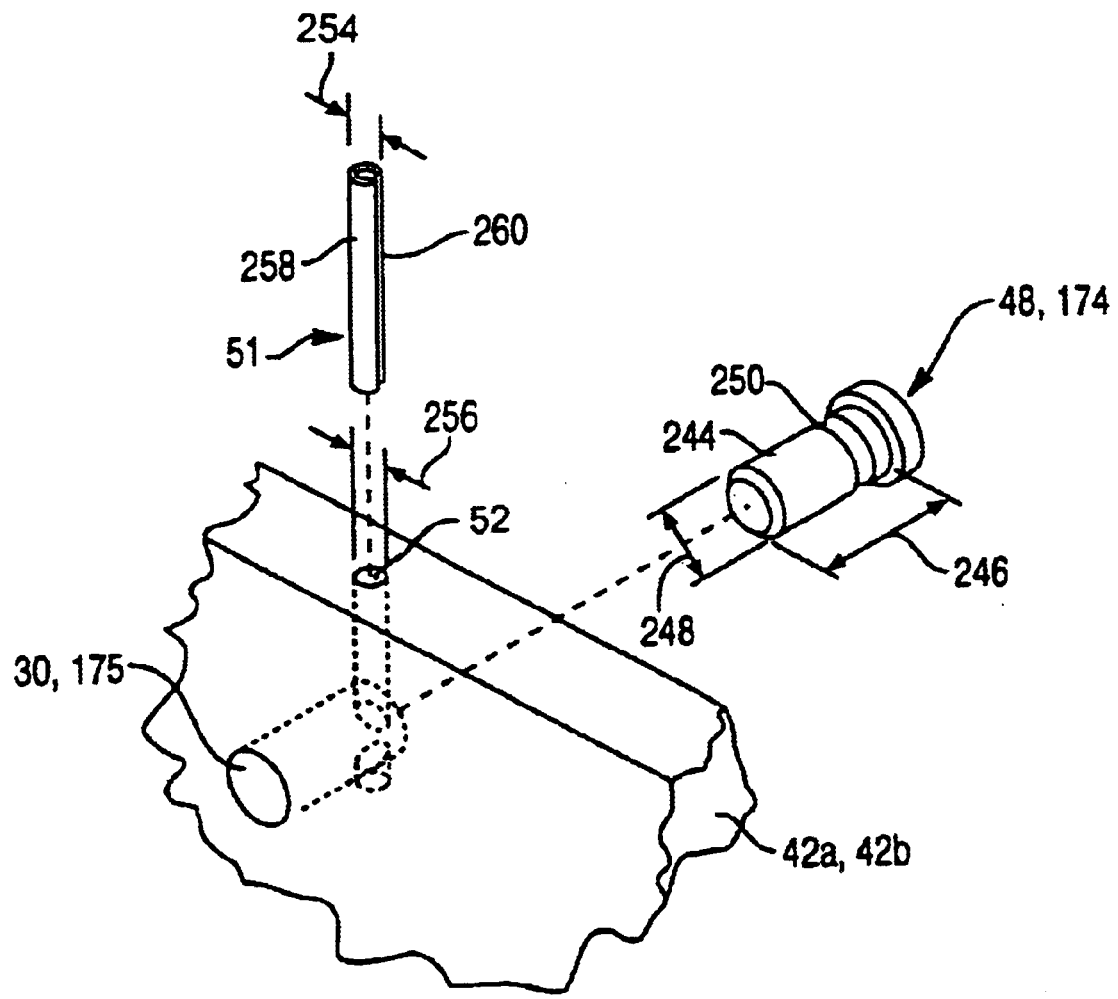
FIG. 34 is an exploded view of one embodiment of a retaining system having a pivot stud and a press pin.

Referring to FIGS. 33 and 34, pivot studs 48, 174 may be held in place by a press pin 51 inserted into an aperture 52 in a side beam 42a. 42b. A pivot stud 48, 174 may have a shaft 244 having a length 246 sufficient to extend through the side beam 42a, 42b and into an aperture or slot (e.g., a slot 54, 171). The stud 48, 174 typically has a diameter 248 such that it can rotate substantially freely within a slot 54, 171 and an aperture 50, 175 may be sized 249 such that the shaft 244 may be manually inserted therethrough. A stud 48, 174 may have a groove 250 formed to engage a press pin 51 inserted into an aperture 52.

The press pin 51 may be substantially permanently inserted into the aperture 52 essentially permanently attaching the stud 48, 174 to the side beam 42a, 42b. The press pin 51 typically has a diameter 254 sized somewhat larger than the diameter 256 of the aperture 52. The shaft 258 is typically hollow with a groove 260 formed therein. The groove 260 may provide for compliance in the shaft 258, enabling the pin to deflect sufficiently to be inserted and thereafter press against the walls of the aperture 52 in order to prevent removal of the press pin 51.

The various embodiments of mounts 40, bases 34, fastening portions 70, and the like provide for a large number of different combinations. The applications incorporated herein by reference present additional possible embodiments of mounts, bases, and the like. Combinations of the above-mentioned embodiments, yielding an apparatus 10 in accordance with the invention are therefore also contemplated within the scope of the present invention. Combinations of the various embodiments of the components of the invention described herinabove are, therefore, hereby disclosed in sufficient detail as examples to allow one skilled in the art to make and use the same without undue experimentation.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An apparatus for connecting a trailing unit to a vehicle, the apparatus comprising:
   a trunnion sized and configured for coupling with a receiver of a vehicle;
   a secured to the trunnion, the trunnion extending from the base in a first direction;
   a mount selectively secured to the base between a first mount position, wherein the mount is juxtaposed with the trunnion, and at least a second mount position, wherein the mount extends from the base in a second direction substantially different from the first direction;
   a first hitch connected to the mount sized and configured to engage with a trailing unit, the first hitch being selectively secured to the mount between a first hitch position rendering the first hitch inaccessible for engagement with a trailing unit and a second hitch position rendering the first hitch accessible for engagement with a trailing unit.

2. The apparatus of claim 1, wherein the apparatus is characterized by a longitudinal direction corresponding generally to a substantially horizontal direction of travel, a lateral direction extending substantially horizontally and substantially orthogonal to the longitudinal direction, and a transverse direction substantially orthogonal to the longitudinal and lateral directions, and wherein the first hitch selectively pivots with respect to the mount.

3. The apparatus of claim 2, wherein the mount pivots with respect to the base about a first lateral axis.

4. The apparatus of claim 3, wherein the first hitch pivots with respect to the mount about a second lateral axis.

5. The apparatus of claim 1 wherein the base is provided with locators and the mount further comprises engagement members to selectively engage the base in alignment with the locators.

6. The apparatus of claim 5, wherein the engagement members slidingly engage the base to translate with respect thereto in a transverse direction therebetween.

7. The apparatus of claim 5, wherein the engagement members are pins.

8. The apparatus of claim 7, wherein the pins are selectively removable from the mount.

9. The apparatus of claim 5, wherein the mount selectively translates in a transverse direction with respect to the base between a plurality of height positions.

10. The apparatus of claim 9, wherein the locators are apertures in the base defining the plurality of height positions in the transverse direction.

11. The apparatus of claim 9, wherein the base is further provided with at least one slot extending transversely and the engagement members are studs slidably engaging the at least one slot.

12. The apparatus of claim 1, wherein the first hitch pivots about a longitudinal axis with respect to the mount.

13. The apparatus of claim 1, wherein the mount pivots about a transverse axis with respect to the base.

14. The apparatus of claim 1, wherein the apparatus further comprises a fastening structure to secure the first hitch to the mount.

15. The apparatus of claim 14, wherein the fastening structure includes a pin sized and configured to extend through a first aperture defined by the mount and a second aperture defined by the first hitch when the first aperture and the second aperture are aligned with one another.

16. The apparatus of claim 1, wherein the mount pivots about a first lateral axis with respect to the base, and the first hitch pivots about a second lateral axis with respect to the mount, and the mount translates along a transverse axis with respect to the base.

17. The apparatus of claim 1, wherein the mount is removable to pivot with respect to the base.

18. The apparatus of claim 1, wherein the hitch is removable to pivot with respect to the mount.

19. The apparatus of claim 1, wherein the first hitch pivots selectively from the second hitch position to the first hitch position with respect to the mount, and the mount selectively pivots from the at least a second mount position to the first mount position.

20. The apparatus of claim 1, wherein the first hitch pivots downward from the second hitch position to the first hitch position with respect to the mount, and the mount pivots downward from the at least a second mount position to the first mount position.

21. The apparatus of claim 1, wherein the first hitch is configured to first pivot downward from the second hitch position to the first hitch position with respect to the mount, and the mount then pivots downward from the at least a second mount position to the first mount position.

22. The apparatus of claim 1, wherein the mount selectively pivots about a first lateral axis to the at least a second mount position, and the first hitch selectively pivots with respect to the mount about a second lateral axis to the second hitch position.

23. The apparatus of claim 1, wherein the mount remains continually connected to the base between the first mount position and the at least a second mount position.

24. The apparatus of claim 23, wherein the mount is pivotably connected to the base between the position and the at least a second mount position.

25. The apparatus of claim 1, wherein the first hitch remains continually connected to the mount between the first hitch position and the second hitch position.

26. The apparatus of claim 25, wherein the first hitch is pivotably connected to the mount between the first hitch position and the second hitch position.

27. The apparatus of claim 1, further comprising a first pivot connecting the mount to the base.

28. The apparatus of claim 27, further comprising a second pivot connecting the first hitch to the mount.

29. The apparatus of claim 1, further comprising a pin to secure the mount to the base to resist pivoting therebetween in the at least a second mount position.

30. The apparatus of claim 14, wherein the fastening structure comprises an extension member extending from the first hitch and having an extension aperture defined therethrough, the mount defining a mount aperture alignable with the extension aperture, and a pin sized and configured to extend through the extension aperture and the mount aperture aligned therewith.

31. The apparatus of claim 1, further comprising a pin sized and configured to secure the first hitch to the mount to resist pivoting therebetween in the second hitch position.

32. The apparatus of claim 1, wherein the base further comprises a concealing surface position to substantially obscure the first hitch from view from a location substantially confronting the concealing surface.

* * * * *

UNITED STATES PATENT AND TRADEMARK OFFICE
CERTIFICATE OF CORRECTION

| | | |
|---|---|---|
| PATENT NO. | : 6,974,148 B2 | Page 1 of 1 |
| APPLICATION NO. | : 10/163086 | |
| DATED | : December 13, 2005 | |
| INVENTOR(S) | : Moss et al. | |

It is certified that error appears in the above-identified patent and that said Letters Patent is hereby corrected as shown below:

In the Claims

Claim 1, line 5, insert --base-- between the words "a" and "secured".

Signed and Sealed this
Thirtieth Day of June, 2015

Michelle K. Lee
*Director of the United States Patent and Trademark Office*